United States Patent
Scheurer

(10) Patent No.: US 6,866,194 B2
(45) Date of Patent: Mar. 15, 2005

(54) SYSTEMS AND METHODS FOR INVENTORY MANAGEMENT

(75) Inventor: Robert P. Scheurer, Collinsville, IL (US)

(73) Assignee: Nestec, Ltd., Vevey (CH)

( * ) Notice: Subject to any disclaimer, the term of this patent is extended or adjusted under 35 U.S.C. 154(b) by 215 days.

(21) Appl. No.: 10/055,319

(22) Filed: Jan. 23, 2002

(65) Prior Publication Data

US 2003/0136834 A1 Jul. 24, 2003

(51) Int. Cl.[7] ............................................. G06F 17/60
(52) U.S. Cl. .................. 235/385; 235/375; 235/376; 235/462.01; 705/22; 705/23
(58) Field of Search .......................... 235/462.01, 383, 235/385, 384, 462.45, 472.01; 705/1–4, 10, 22, 23; 707/10

(56) References Cited

U.S. PATENT DOCUMENTS

| | | | |
|---|---|---|---|
| 4,835,372 A | * | 5/1989 | Gombrich et al. .......... 235/375 |
| 5,537,313 A | | 7/1996 | Pirelli |
| 5,597,995 A | * | 1/1997 | Williams et al. ............ 235/375 |
| 5,611,051 A | | 3/1997 | Pirelli |
| 5,712,989 A | | 1/1998 | Johnson et al. |
| 6,094,642 A | | 7/2000 | Stephenson et al. |
| 6,105,004 A | | 8/2000 | Halperin et al. |
| 6,182,053 B1 | | 1/2001 | Rauber et al. |
| 6,188,991 B1 | | 2/2001 | Rosenweig et al. |
| 6,208,974 B1 | * | 3/2001 | Campbell et al. ............ 705/3 |
| 6,236,979 B1 | * | 5/2001 | Kawabata .................... 705/26 |
| 6,346,885 B1 | * | 2/2002 | Curkendall ............. 340/572.4 |
| 6,397,190 B1 | * | 5/2002 | Goetz ............................. 705/3 |
| 6,418,441 B1 | * | 7/2002 | Call ............................ 707/10 |
| 6,484,169 B1 | * | 11/2002 | Wilsford ....................... 707/6 |
| 6,576,280 B2 | * | 6/2003 | Bebiak et al. ............. 426/232 |
| 6,547,224 B2 | * | 8/2003 | Pratt et al. ..................... 705/2 |
| 6,642,946 B1 | * | 11/2003 | Janes et al. ................. 345/854 |

* cited by examiner

Primary Examiner—Michael G. Lee
Assistant Examiner—Ahshik Kim
(74) Attorney, Agent, or Firm—Sanjay Agrawal, Esq.; Armstrong Teasdale LLP

(57) ABSTRACT

A veterinary inventory management system is disclosed which includes a computer, a scanning device capable of interfacing to the computer, at least one printer capable of interfacing to the computer, and a computer program loaded and running on the computer. The computer program product enables the computer to identify product shortages and prepare product orders for a veterinary practice.

44 Claims, 36 Drawing Sheets

~ Add Items to Catalog ~

| Check to Add | UPC | Product | Product | Item Type | Manufacturer | Weight | | Primary Distributor ID | Unit Cost |
|---|---|---|---|---|---|---|---|---|---|
| ☑ | 01780041975 | DOG CHOW | Canine ▼ | Dry ▼ | Purina ▼ | 50 | lb ▼ | PURINA ▼ | $0.00 |
| | NOTE: | DST00 3117 R1 #88, DP00 5903 R1 #6, R2 #6, R3 #6, R4 #6 | | | | | | | |
| ☐ | 10038100551266 | ProPlan Special Cat 4-8 lb Pouches | ▼ | ▼ | ▼ | 0 | ▼ | ▼ | $0.00 |
| | NOTE: | | | | | | | | |
| ☐ | 03810051907 | PROPLAN PUPPY Chicken Rice 50 # | ▼ | ▼ | ▼ | 0 | ▼ | ▼ | $0.00 |
| | NOTE: | DG00 1234 R1 | | | | | | | |
| ☐ | 01780841399 | PUPPY CHOW BEEF | ▼ | ▼ | ▼ | 0 | ▼ | ▼ | $0.00 |
| | NOTE: | DP01 1221 | | | | | | | |
| ☐ | 01780057024 | PURINA O.N.E. PUPPY | ▼ | ▼ | ▼ | 0 | ▼ | ▼ | $0.00 |

Add Product to Catalog

Done

FIG. 9

[Purina VIMS]

☐ VIMS Manual    📇 Contact    🔖 Purina Vets Web Site

PURINA®

[ Update Catalog ]

[ Start-Up Procedures ]

~ Administration Updates ~

| File Name | File Description | Path |
|---|---|---|
| Bartend.EXE | Executable file that opens BarTender software for printing labels. | C:\Program Files\BarTender |
| Catalog.txt | This file is created from the "Products" table to be used in the BarTender software. It can also be used to update the PDA's catalog. | C:\Palm\VIMS1P\On Hand |
| Inventory.txt | File that is created from a HotSync. It contains the current Inventory. | C:\Palm\VIMS1P\On Hand |
| Label.txt | This file is created from the "Products" table to be used in the BarTender software. | C:\Purina_VIMS |
| NewUPClabelFile.txt | File that is created of new product items that have been added to the "Products" table. It is then used to print labels from the BarTender software. | C:\Purina_VIMS |
| Order.rtf | "Product Order" text file that is attached to an e-mail order. | C:\Program Files\VIMS_GUI |

~ Examine Inventory ~

PURINA®

View/Print Current Inventory Report

Main Menu | Add New Product | | | | Edit SKU | Edit Qty | Remove Min/Max |
| | | | | | | Edit Min/Max |

| Inventory Date | Product UPC | Product | Category | Size | SKU | Qty On Hand | Min Qty | Max Qty |
|---|---|---|---|---|---|---|---|---|
| 7/31/2001 3:53:45 PM | 0178004573 | CAT CHOW ORIGINAL | Feline | 18.0 lb Dry | | 40 | 10 | 40 |
| 7/31/2001 3:53:45 PM | 03810052029 | Chicken & Rice | Canine | 37.5 lb Dry | | 34 | | |
| 7/31/2001 3:53:45 PM | 0178004185 | DOG CHOW | Canine | 37.5 lb Dry | | 15 | | |
| 7/31/2001 3:53:45 PM | 0178004183 | DOG CHOW LITTLE BITES | Canine | 37.5 lb Dry | | 16 | | |
| 7/31/2001 3:53:45 PM | 0178004147 | FIT & TRIM | Canine | 37.5 lb Dry | | 38 | | |
| 7/31/2001 3:53:45 PM | 0178004537 | KITTEN CHOW ORIGINAL | Feline | 3.5 lb Dry | | 156 | | |
| 7/31/2001 3:53:45 PM | 03810003048 | MOIST & MEATY BURGER CHS | Canine | 216 oz Soft-moist | | 7 | 4 | 10 |
| 7/31/2001 3:53:45 PM | 03810001145 | Ocean Fish | Feline | 5.5 oz Can | | 105 | | |
| 7/31/2001 3:53:45 PM | 03810059064 | Pro Plan Kitten Chicken & Rice | Feline | 20.0 lb Dry | | 17 | | |
| 7/31/2001 3:53:45 PM | 0178004045 | PUPPY CHOW ORIGINAL | Canine | 8.5 lb Dry | | 10 | | |
| 7/31/2001 3:53:45 PM | 0178057079 | PURINA O.N.E. REDUCED CALORIE | Canine | 20.0 lb Dry | | 14 | | |
| 7/31/2001 3:53:45 PM | 0178005261 | PURINA O.N.E. TURKEY/RICE | Canine | 16.0 lb Dry | | 3 | | |
| 7/31/2001 3:53:45 PM | 0702301191 | SECOND NATURE DOG LITTER | Canine | 25.0 lb Dry | | 34 | | |
| 7/31/2001 3:53:45 PM | 07023010770 | TIDY CATS IOC | Feline | 20.0 lb Dry | | 989 | | |
| 7/31/2001 3:53:45 PM | 07023010710 | TIDY CATS LLOC | Feline | 10.0 lb Dry | | 100 | | |

~ Add Item to Current Inventory ~

Product UPC  01780049100

Product  ALLEY CAT BEEF/LIVER

Size  3.5 lb - Dry

SKU

Quantity On Hand  5

Save New    Cancel

Return to View Total Inventory

Main Menu

FIG. 13

[Purina VIMS]

☐ VIMS Manual  📧 Contact  🔒 Purina Vets Web Site

PURINA®

~ Inventory History ~

[ Main Menu ]    Archived Inventory Date [ 7/31/2001 4:09:26 PM ▼ ]

| Inventory Date | UPC | Product | Size | SKU | Qty | Min Alld | Max Alld |
|---|---|---|---|---|---|---|---|
| 7/31/2001 3:53:45 PM | 01780040455 | PUPPY CHOW ORIGINAL | 8.5 lb Dry | | 10 | | |
| 7/31/2001 3:53:45 PM | 01780041483 | DOG CHOW LITTLE BTS | 37.5 lb Dry | | 16 | | |
| 7/31/2001 3:53:45 PM | 01780041865 | DOG CHOW | 37.5 lb Dry | | 15 | | |
| 7/31/2001 3:53:45 PM | 01780044147 | FIT & TRIM | 37.5 lb Dry | | 36 | | |
| 7/31/2001 3:53:45 PM | 01780045337 | KITTEN CHOW ORIGINAL | 3.5 lb Dry | | 156 | | |
| 7/31/2001 3:53:45 PM | 01780045573 | CAT CHOW ORIGINAL | 18.0 lb Dry | | 40 | 10 | 40 |
| 7/31/2001 3:53:45 PM | 01780053261 | PURINA O.N.E. TURK/RC | 16.0 lb Dry | | 3 | | |
| 7/31/2001 3:53:45 PM | 01780057079 | PURINA O.N.E. RED CAL | 20.0 lb Dry | | 14 | | |
| 7/31/2001 3:53:45 PM | 03810001145 | Ocean Fish | 5.5 oz Can | | 105 | | |
| 7/31/2001 3:53:45 PM | 03810033048 | MOIST & MTY BGR CHS | 216 oz Sft-mst | | 7 | 4 | 10 |
| 7/31/2001 3:53:45 PM | 03810052029 | Chicken & Rice | 37.5 lb Dry | | 34 | | |
| 7/31/2001 3:53:45 PM | 03810059064 | Pro Plan Kitten Ch & Rc | 20.0 lb Dry | | 17 | | |
| 7/31/2001 3:53:45 PM | 07023001191 | SCD NATURE DOG LIT | 25.0 lb Other | | 34 | | |
| 7/31/2001 3:53:45 PM | 07023010710 | TIDY CATS LLOC | 10.0 lb Other | | 100 | | |
| 7/31/2001 3:53:45 PM | 07023010770 | TIDY CATS IOC | 20.0 lb Other | | 969 | | |

FIG. 18

~ View Product Catalog ~

| UPC | Product | Manufacturer | Primary Dist | Unit Cost | Cost Date | Size |
|---|---|---|---|---|---|---|
| 01780040455 | PUPPY CHOW ORIGINAL | Purina | PURINA | $0.00 | 6/2/2001 | 8.5 lb Dry |
| 01780041483 | DOG CHOW LITTLE BITES | PURINA | PURINA | $14.56 | 3/23/2001 | 37.5 lb Dry |
| 01780041865 | DOG CHOW | PURINA | PURINA | $3.00 | 3/23/2001 | 37.5 lb Dry |
| 01780044147 | FIT & TRIM | PURINA | PURINA | $19.99 | 3/23/2001 | 37.5 lb Dry |
| 01780044600 | ALLEY CAT | Purina | PURINA | $0.00 | 3/19/2001 | 7.0 lb Dry |
| 01780045337 | KITTEN CHOW ORIGINAL | PURINA | PURINA | $3.69 | 3/23/2001 | 3.5 lb Dry |
| 01780045573 | CAT CHOW ORIGINAL | PURINA | PURINA | $10.06 | 3/23/2001 | 18.0 lb Dry |
| 01780049100 | ALLEY CAT BEEF/LIVER | Purina | BUTLER | $0.00 | 3/19/2001 | 3.5 lb Dry |
| 01780049171 | ALLEY CAT BEEF/LIVER | Purina | MIDWEST | $0.00 | 3/19/2001 | 7.0 lb Dry |
| 01780053261 | PURINA O.N.E. TURK/RICE | PURINA | BUTLER | $0.00 | 3/23/2001 | 16.0 lb Dry |
| 01780057079 | PURINA O.N.E. RED CAL | PURINA | PURINA | $0.00 | 3/23/2001 | 20.0 lb Dry |
| 03810000116 | NF KidNey Failure | Purina | PURINA | $0.87 | 1/1/2001 | 5.5 oz Can |
| 03810000700 | UR Urinary | Purina | PURINA | $0.82 | 1/1/2001 | 5.5 oz Can |
| 03810000702 | CV Cardio Vascular | Purina | PURINA | $0.82 | 1/1/2001 | 5.5 oz Can |
| 03810001145 | Ocean Fish | Purina | PURINA | $0.00 | 3/23/2001 | 5.5 oz Can |
| 03810001325 | DCO Diabetes Colitis | Purina | PURINA | $0.91 | 1/1/2001 | 5.5 oz Can |
| 03810001491 | CDO Diabetes Colitis | Purina | PURINA | $11.86 | 1/1/2001 | 8.0 lb Dry |
| 03810001492 | EN - Gastroenteric | Purina | PURINA | $14.20 | 1/1/2001 | 8.0 lb Dry |
| 03810001493 | NF DidNey Failure | Purina | PURINA | | 1/1/2001 | 8.0 lb Dry |

FIG. 21

Shipping Address ○ Click here if Shipping Address is the SAME as Clinic Address

- Contact Last / Contact First
- Address: Veterinary Medical Center / SE Corner of Bogue St. & Wilson Rd
- Phone
- Extension
- City: East Lansing
- Email
- State: MI
- Fax
- Zip: 48824-1314

Billing Address ○ Click here if Billing Address is the SAME as Clinic Address

- Contact Last / Contact First
- Address: Veterinary Medical Center / SE Corner of Bogue St. & Wilson Rd
- Phone
- Extension
- City: East Lansing
- Email
- State: MI
- Fax
- Zip: 48824-1314

Save Changes
Maintenance Menu

[Purina VIMS]

☐ VIMS Manual  ✆ Contact  👤 Purina Vets Web Site

PURINA®

~ *View Inventory Controls* ~

| View/Print Inventory Controls |
|---|
| Maintenance Menu |

| Set Product Controls | | Edit SKU | | Edit Min/Max | |
|---|---|---|---|---|---|
| UPC | Product | Size | SKU | Minimum Allowed | Maximum Allowed |
| 0178004573 | CAT CHOW ORIGINAL | 18.0 lb Dry | 4 | 10 | 40 |
| 0381003348 | MOIST & MEATY BURGER CHS | 216 oz Soft-moist | | | 10 |

Exception Report

| UPC | Product/Note | Quantity |
|---|---|---|
| 01780041975 | DOG CHOW 50# DST00 3117 R1 #88,DP00 5903 R1 #6, R2 #6, R3 #6, R4 #6 | 88 |
| 10038100551266 | Pro Plan Special Cat 4-8 lb Pouches | 48 |
| 3810051907 | PROPLAN PUPPY Chicken Rice 50 # DG 00 1234 R1 | 39 |
| 1780041399 | PUPPY CHOW BEEF DP01 1221 | 7 |
| 1780057024 | PURINA O.N.E. PUPPY LAMB/RICE 20# DP01 1240 #9 | 1 |
| 4755710015 | Yesterdays News Cat Litter | 52 |
| 19014111320 | | 1 |
| 038100051885 | | 1 |
| 05274265240 | | 1 |

FIG. 29

Current Inventory

*← 440*

| Product | UPC | SKU | Size | Qty on Hand | (Min Qty | Max Qty) | Inventory Date |
|---|---|---|---|---|---|---|---|
| *Manufacturer: PURINA* | | | | | | | |
| *Category:* CANINE | | | | | | | |
| CHICKEN & RICE | 03810052029 | | 37.5 lb Dry | 34 | ( | ) | 7/31/2001 4:09:19 PM |
| DOG CHOW | 01780041865 | | 37.5 lb Dry | 15 | ( | ) | 7/31/2001 4:09:19 PM |
| DOG CHOW LITTLE BITES | 01780041483 | | 37.5 lb Dry | 16 | ( | ) | 7/31/2001 4:09:19 PM |
| FIT & TRIM | 01780044147 | | 37.5 lb Dry | 36 | ( | ) | 7/31/2001 4:09:19 PM |
| MOIST & MEATY BURGER CHS | 03810033048 | | 216 oz Sft-moi | 7 | ( 4 | 10 ) | 7/31/2001 4:09:19 PM |
| PUPPY CHOW ORIGINAL | 01780040455 | | 8.5 lb Dry | 10 | ( | ) | 7/31/2001 4:09:19 PM |
| *Category:* FELINE | | | | | | | |
| CAT CHOW ORIGINAL | 01780045573 | | 18.0 lb Dry | 40 | ( 10 | 40 ) | 7/31/2001 4:09:19 PM |
| KITTEN CHOW ORIGINAL | 01780045337 | | 3.5 lb Dry | 156 | ( | ) | 7/31/2001 4:09:19 PM |
| OCEAN FISH | 03810001145 | | 5.5 oz Can | 105 | ( | ) | 7/31/2001 4:09:19 PM |
| PRO PLAN KITTEN CHICKEN & RICE | 03810059064 | | 20.0 lb Dry | 17 | ( | ) | 7/31/2001 4:09:19 PM |
| TIDY CATS IOC | 07023010770 | | 20.0 lb Other | 969 | ( | ) | 7/31/2001 4:09:19 PM |

*Page 1 of 2*

FIG. 30

Product Order ← 450

Ship to arrive by: Sunday, August 05, 2002   Order Creation Date: Wednesday, August 01, 2002
Charge Number:                                Purchase Order Number: PURINA 08/01/02
                                              Account Number:

PURINA DISTRIBUTION:

| Contact: Bob | Voice number: | Voice number Ext: | Fax number: |
|---|---|---|---|
| | (555)-555-5555 | 555 | (555)-555-5556 |

Shipping Information:

Ship to: Doctor
Attention:
    Veterinary Medical Center
    ADDRESS
    CITY, STATE ZIP Ship - To Telephone:

Billing Information:

Bill to: Doctor
Attention:
    Veterinary Medical Center
    ADDRESS
    CITY, STATE ZIP Bill - To Telephone:

Order Detail:

| Manufacturer | UPC | Product | Size | Unit Cost | Qty | Total Cost |
|---|---|---|---|---|---|---|
| Purina | 01780049100 | ALLEY CAT BEEF/LIVER | 3.5 lb | $0.00 | 3 | $0.00 |

Total Order Cost: $0.00

Page 1 of 1

FIG. 31

Product Order - History Report

Ship to arrive by: Sunday, August 05, 2002   Order Creation Date: Tuesday, July 31, 2002
Order Sent: Tuesday, July 31, 2002   Purchase Order Number: PURINA 07/31/02
Charge Number:   Account Number:

PURINA DISTRIBUTION

| Contact: Bob | Voice number: | Voice number Ext: | Fax number: |
|---|---|---|---|
| | (555)-555-5555 | 555 | (555)-555-5556 |

*Billing Information:*

Bill to: Doctor
Attention:
    Veterinary Medical Center
    ADDRESS
    CITY, STATE ZIP Bill - To Telephone:

*Shipping Information:*

Ship to: Doctor
Attention:
    Veterinary Medical Center
    ADDRESS
    CITY, STATE ZIP Ship - To Telephone:

*Order Detail:*

| Manufacturer | UPC | Product | Size | Unit Cost | Qty | Total Cost |
|---|---|---|---|---|---|---|
| Purina | 03810056067 | CV Cardio Vascular | 12.5 oz | $1.04 | 1 | $1.04 |
| Purina | 01780049100 | ALLEY CAT BEEF/LIVER | 3.5 lb | $0.00 | 3 | $0.00 |
| | | | | Total Order Cost: | | $1.04 |

FIG. 32

Product Report

| UPC | Product | Manufacturer | Distributor | Size | Unit Cost | Cost Date |
|---|---|---|---|---|---|---|
| 01780040455 | PUPPY CHOW ORIGINAL | Purina | PURINA | 8.5 lb Dry | $0.00 | 6/2/2001 |
| 01780041483 | DOG CHOW LITTLE BITES | PURINA | PURINA | 37.5 lb Dry | $14.56 | 3/23/2001 |
| 01780041865 | DOG CHOW | PURINA | PURINA | 37.5 lb Dry | $3.00 | 3/23/2001 |
| 01780041975 | DOG CHOW 50# | test | PURINA | 4.4 lb test | $0.00 | 7/31/2001 |
| 01780044147 | FIT & TRIM | PURINA | PURINA | 37.5 lb Dry | $19.99 | 3/23/2001 |
| 01780044600 | ALLEY CAT | Purina | PURINA | 7.0 lb Dry | $0.00 | 3/19/2001 |
| 01780045337 | KITTEN CHOW ORIGINAL | PURINA | PURINA | 3.5 lb Dry | $3.69 | 2/23/2001 |
| 01780045573 | CAT CHOW ORIGINAL | PURINA | PURINA | 18.0 lb Dry | $10.06 | 3/23/2001 |
| 01780049100 | ALLEY CAT BEET/LIVER | Purina | BUTLER | 3.5 lb Dry | $0.00 | 3/19/2001 |
| 01780049171 | ALLEY CAT BEET/LIVER | Purina | MIDWEST | 7.0 lb Dry | $0.00 | 3/19/2001 |
| 01780053261 | PURINA O.N.E. TURKEY/RICE | PURINA | BUTLER | 16.0 lb Dry | $0.00 | 3/23/2001 |
| 01780057079 | PURINA O.N.E. REDUCED CALORIE | PURINA | PURINA | 20.0 lb Dry | $0.00 | 3/23/2001 |
| 03810000116 | NF KidNey Failure | Purina | PURINA | 5.5 oz Can | $0.87 | 1/1/2001 |

Page 1 of 4

FIG. 33

Primary Product Distributor Conflict Report

The following Products are assigned to the Primary Distributor ID: PURINA

\*\*Before this Distributor ID can be deleted, a different primary distributor must be assigned to the product(s) listed below. To change the product's primary distributor go to the Main Menu, Manage Inventory, Maintenance, Product Catalog, then highlight the product form the list and select Edit Record button, changes to the Primary Distributor ID can be made on the Product Catalog form.

| UPC | Product |
| --- | --- |
| 01780040455 | PUPPY CHOW ORIGINAL |
| 01780041483 | DOG CHOW LITTLE BITES |
| 01780041865 | DOG CHOW |
| 01780044147 | FIT & TRIM |
| 01780045337 | KITTEN CHOW ORIGINAL |
| 01780045573 | CAT CHOW ORIGINAL |
| 01780057079 | PURINA O.N.E. REDUCED CALORIE |
| 03810000116 | NF KidNey Failure |
| 01810000700 | UR Urinary |
| 03810000702 | CV Cardio Vascular |
| 03810001145 | Ocean Fish |
| 03810001325 | DCO Diabetes Colitis |
| 03810001491 | CDO Diabetes Colitis |
| 03810001492 | EN - Gastroenteric |
| 03810001493 | NF KidNey Failure |

FIG. 34

Inventory Controls ~490

| UPC | Product | Size | SKU | Minimum Allowed | Maximum Allowed |
|---|---|---|---|---|---|
| 01780045573 | CAT CHOW ORIGINAL | 18.0 lb Dry | | 10 | 40 |
| 03810033048 | MOIST & MEATY BURGER CH | 216 oz Soft- | | 4 | 10 |

SYSTEMS AND METHODS FOR INVENTORY MANAGEMENT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to inventory management, and more specifically to, inventory management within veterinary practices.

Over the last few years veterinary practice has become highly specialized. Manufacturers of animal care products have invested large amounts of money into research resulting in a proliferation of products available to veterinary service providers. As a result, veterinary practice has become much more complex, and veterinary service providers are required to stock many more products, for example, food and drug products. It is not uncommon, for example, for a dog to have as many as four or five different nutritional needs throughout a life. The manufacturers have responded with nutritional formulas that addresses these nutritional needs. A veterinary practice, at least in these times, needs solutions to the problems of maintaining adequate levels of consumable inventory.

BRIEF DESCRIPTION OF THE INVENTION

In one aspect, a veterinary inventory management system is provided that comprises a computer, a scanning device capable of interfacing to the computer, at least one printer capable of interfacing to the computer, and a computer program which enables the computer to identify product shortages and prepare product orders for at least one of electronic mailing, facsimile, courier, or postal service delivery.

In another aspect a computer is provided which is programmed to identify product shortages, allow addition of non-standard items to a veterinary practice inventory, and prepare product orders for at least one of electronic mailing, facsimile, courier, or postal service delivery.

In still another aspect, a method is provided for creating orders for an inventory control setup. The method comprises displaying a maintenance list, selecting an inventory controls link from the maintenance list, displaying an inventory controls screen, setting product controls, adding products from a product UPC list, and saving the added product entries.

In yet another aspect, a method for placing replenishment orders is provided. The method comprises displaying a number of orders that have been created, selecting one of the orders, and sending the order.

In a further aspect, a method for placing supplemental orders is provided which comprises displaying an order form screen, selecting a supplemental order form link from the order form screen, displaying a new order screen, entering at least one of a purchase order number, a distributor's name, a charge number, a ship to arrive by date, and comments for items within the supplemental order, moving the items to a to be ordered list, and sending the order.

In a still further aspect, a method of updating an inventory is provided which comprises displaying an examine inventory screen, selecting to add new products from the screen, saving the new product additions into the inventory, and viewing the inventory.

BRIEF DESCRIPTION OF THE DRAWINGS

FIG. 9 is one embodiment of an add items to catalog screen.

FIG. 10 is one embodiment of an administration updates screen.

FIG. 12 is one embodiment of an examine inventory screen.

FIG. 13 is one embodiment of an add item to current inventory screen.

FIG. 18 is one embodiment of an inventory history screen.

FIG. 21 is one embodiment of a view product catalog screen.

FIGS. 24A and 24B are one embodiment of a clinic information screen.

FIG. 25 is one embodiment of a distributor data screen.

FIG. 26 is one embodiment of a view inventory controls screen.

FIG. 29 is one embodiment of an exception report.

FIG. 30 is one embodiment of a current inventory report.

FIG. 31 is one embodiment of a product order report.

FIG. 32 is one embodiment of a product order—history report.

FIG. 33 is one embodiment of a product report.

FIG. 34 is one embodiment of a primary product distributor conflict report.

FIG. 35 is one embodiment of an inventory controls report.

DETAILED DESCRIPTION OF THE INVENTION

Figure 1:
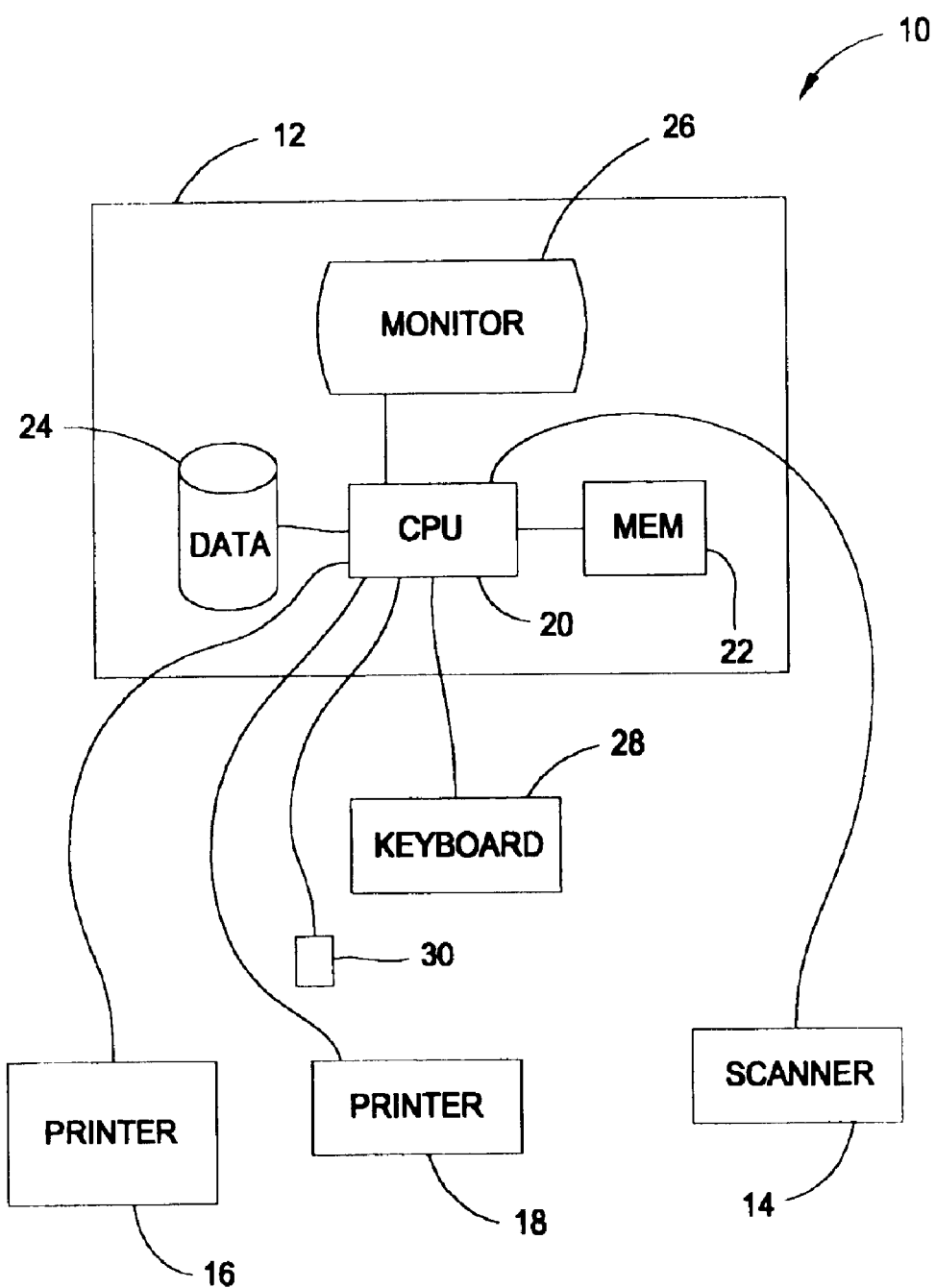
FIG. 1 is a block diagram of one embodiment of an inventory management system.

FIG. 1 is a block diagram of one embodiment of a veterinary inventory management system (VIMS) 10. System 10 includes a standard personal computer 12, a scanner 14, and printers 16, 18. In particular embodiments, scanner 14 is a hand held scanner, printer 16 is a barcode label printer, and printer 18 is a standard page printer. Computer 12 includes a central processing unit (CPU) 20, which is communicatively connected to a memory 22, a storage unit or disk drive 24, a monitor 26, a keyboard 28 and a mouse 30. Installed and stored on disk drive 24 is a VIMS software program which configures system 10 and allows users to rapidly identify shortages and automatically order necessary product. In addition, non-standard product items specific to a veterinary practice may be added by the user and barcoded for future tracking and reordering convenience. Printer 18 prints all reports and orders.

By using the VIMS software product, system 10 is an inventory maintenance tool designed for the veterinary community and is configured to generate orders for veterinary products based on specific requirements of individual institutions. Data is entered into system 10, either by hand with keyboard 28 and mouse 30 or with scanner 14, enabling inventory levels which are maintained at predetermined levels.

In one embodiment, the VIMS software product is a Microsoft Access application and allows inventory assessment, order creation, product catalog maintenance, and bar code label printing. Access is a registered trademark of Microsoft Corporation, Redmond, Wash. In another embodiment, scanner 14 is a personal digital assistant (PDA) based bar code reader configured with an inventory and asset tracking software application. One exemplary application is entitled "On Hand". For bar code label printing, system 10 can further be configured with a label printing software package which format labels for printing using either standard printer 18 or bar code printer 16. One exemplary software package for label printing is entitled BarTender®. BarTender is a registered trademark of Seagull Scientific, Inc., Bellevue, Wash.

System 10 allows inventories to be taken using a catalog of items (not shown) which has been downloaded into handheld scanner 14, which identifies the items by name if known, or by barcode numeric if unknown. In addition, items are identified by collecting barcodes (and quantities) of any items in inventory, sometimes called an inventory taken "from scratch". Either collection method allows the resulting information to be transferred to computer 12, where a tab-delimited text file is created for use by the VIMS software product.

Methods are described below for a better understanding of how an implementation of system 10 helps with inventory management.

Figure 2:
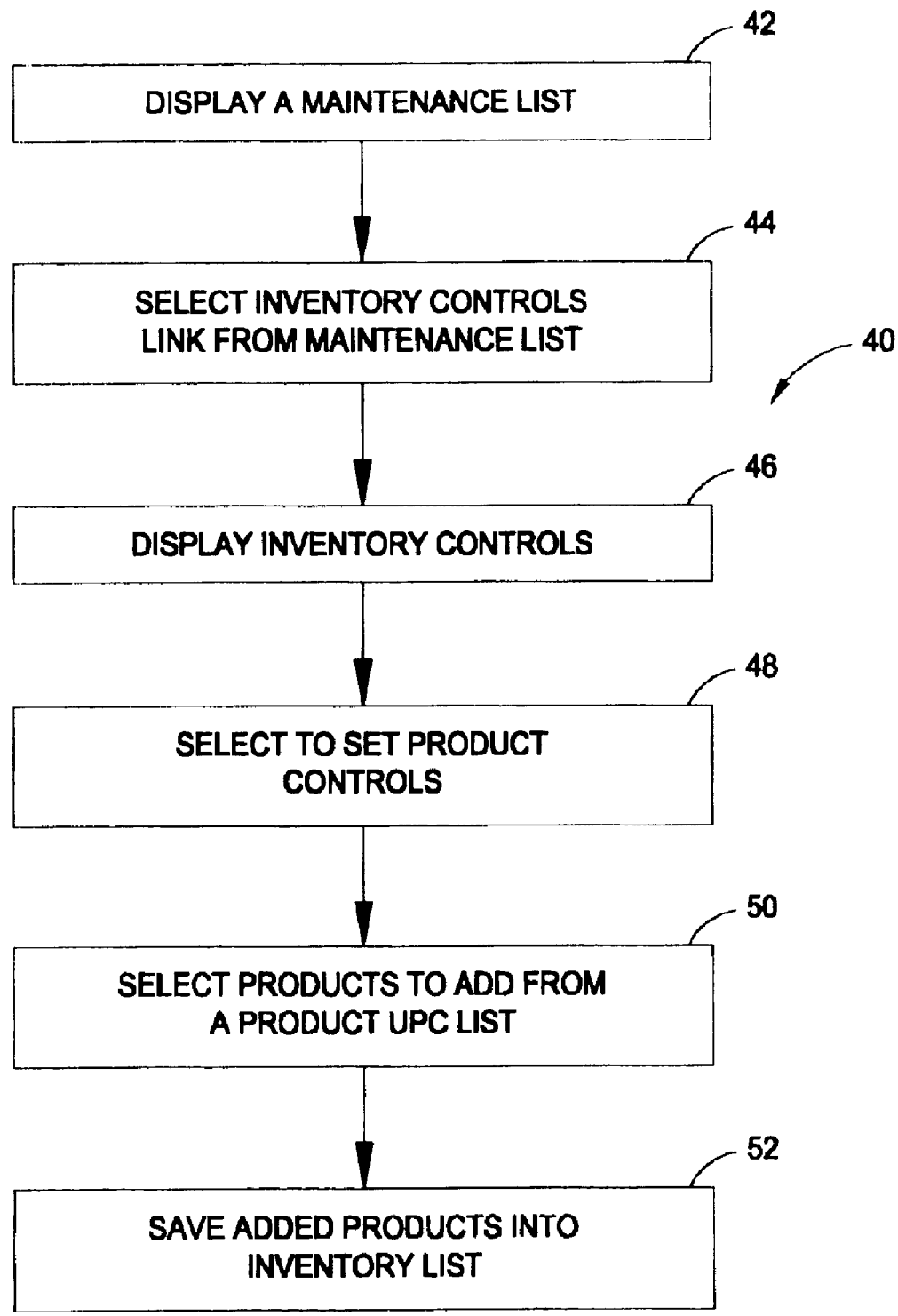
FIG. 2 is a flowchart describing an inventory setup.

FIG. 2 is a flowchart 40 describing an inventory setup. To create orders for an inventory control setup, the enter VIMS link is selected from VIMS start-up procedures screen (shown in FIG. 7), Main menu screen (shown in FIG. 11) is displayed. From the main menu screen, the maintenance link is selected. Selection of maintenance causes a maintenance list to be displayed 42 on the screen. The user at this selects 44 an inventory controls link from the maintenance list, causing view inventory controls screen (shown in FIG. 26) to be displayed 46. The user now selects 48 a set product controls link from the view inventory controls screen. Products to be added are then selected 50 from a product UPC list, and the user enters a SKU, if required, a minimum allowed per unit amount and a minimum allowed per unit amount. The user saves 52 the entries by selection of a save inventory item link. For additional products, the user selects minimum and maximum values for those added product. When complete the user either returns to view inventory controls screen or to main menu screen.

Figure 3:
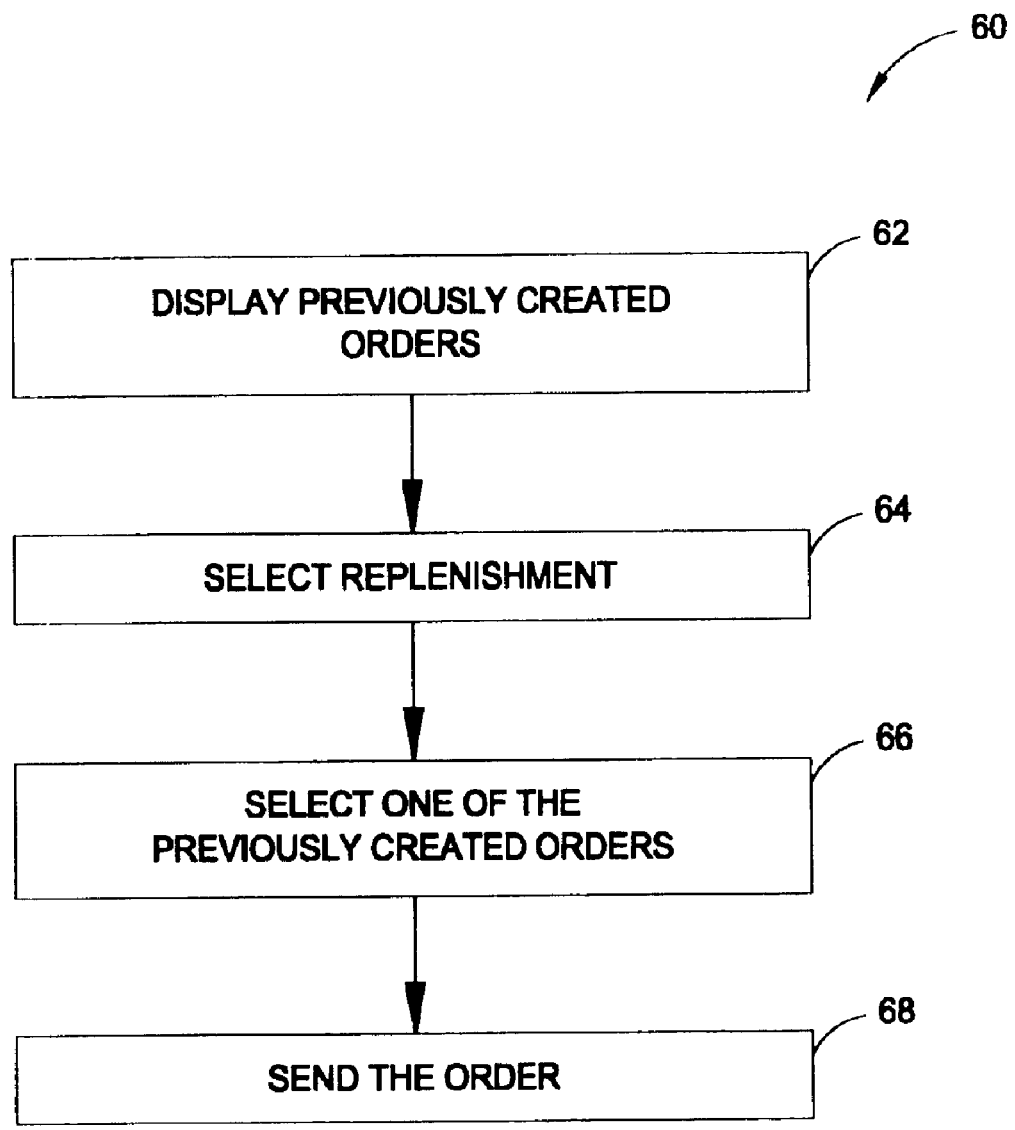
FIG. 3 is a flowchart describing placement of replenishment orders.

FIG. 3 is a flowchart 60 describing placement of replenishment orders. To place replenishment orders, from main menu screen (shown in FIG. 11) the generate order link is selected, causing order form screen (shown in FIG. 14) to be displayed 62, showing previously placed orders. From order form screen, the replenishment link is selected 64 and a message box will appear stating a number of orders that have been created. One order is created for each distributor Selection of an OK button within the message box enables a return to order form screen, where orders created are listed in the open purchase order list box. Highlighting or selection 66 of one order enables to viewing the order and likewise the sending 68 of the order. Sending of orders is described below.

Figure 4:
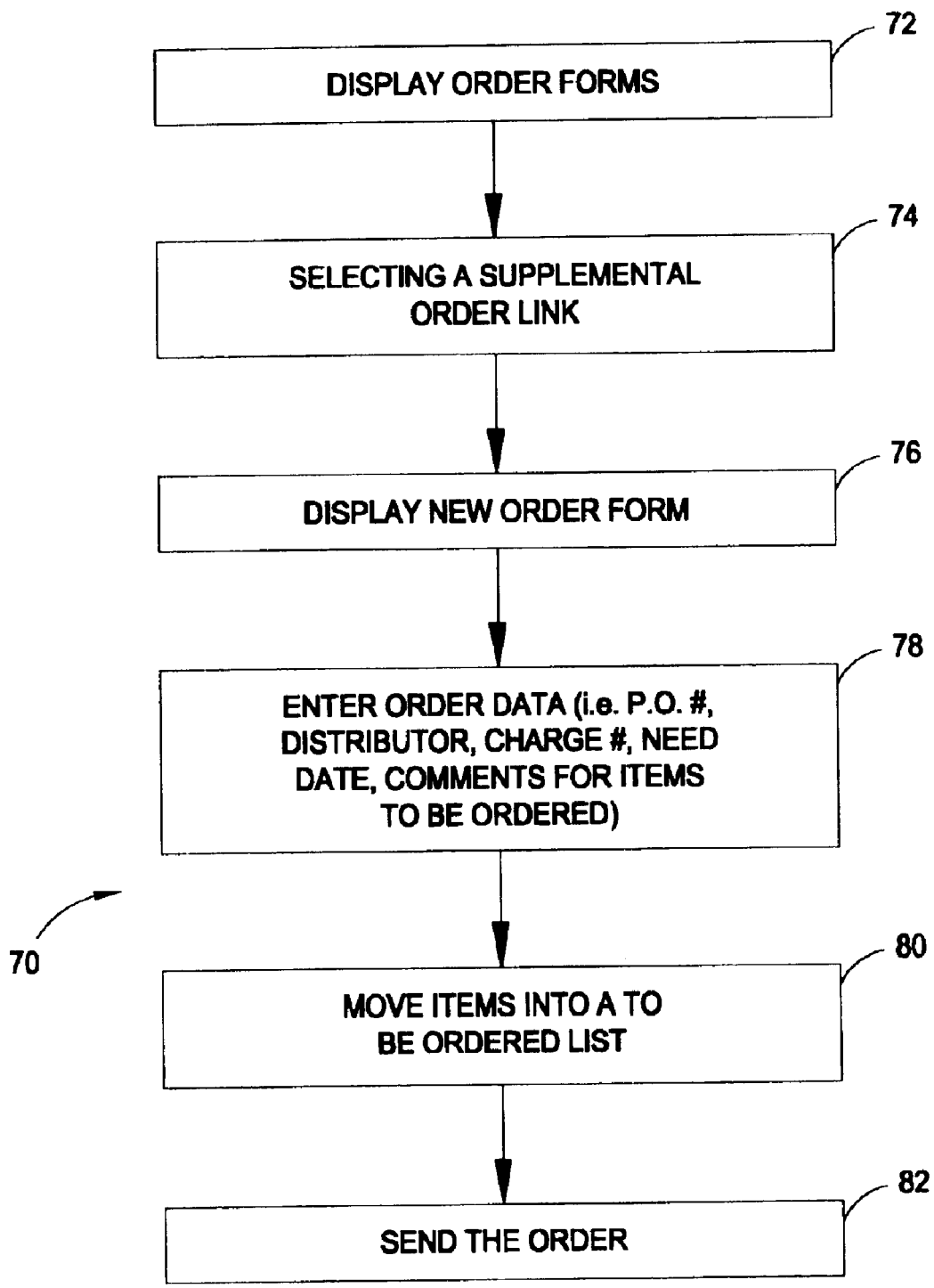
FIG. 4 is a flowchart describing placement of supplemental orders.
Figure 5:
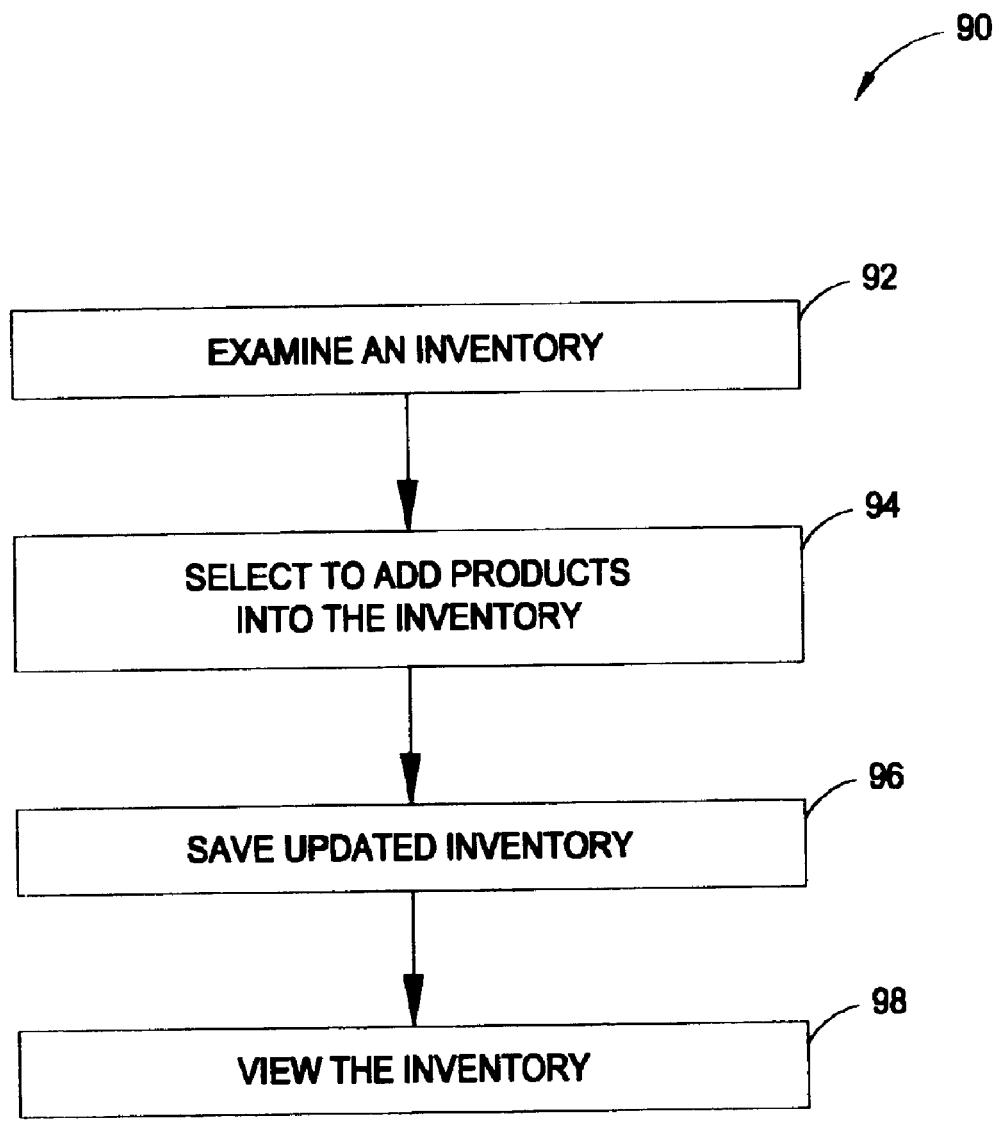
FIG. 5 is a flowchart describing the addition of new products to an inventory.

FIG. 4 is a flowchart 70 describing placement of supplemental orders. To place supplemental orders, from main menu screen (shown in FIG. 11) the generate order link is selected, causing order form screen (shown in FIG. 14) to be displayed 72. From order form screen, the supplemental order link is selected 74, causing new order screen (shown in FIG. 15) to be displayed 76. The following fields are entered 78 for items to be ordered, purchase order number, distributor's name, charge number (optional field), ship to arrive by date (mm dd yyyy), and comments, charge number and comments being optional. Selection of an accept link on new order screen returns system 10 to displaying of the order form screen, where the items for the supplemental order are displayed within the available catalog items list, and can be moved 80 to the items to be ordered list. Selection of the save button causes system 10 to save orders for later completion and sending. Selection of the preview order link allows the user to view the order before sending. Selection of the send order link causes system 10 to send 82 the order.

To send orders, an order is selected from the open purchase order list. The send order link is selected, and ordering options screen (shown in FIG. 17) is displayed. One of the options from ordering options screen, E-mail or printer, is selected. Email will send orders via email. Print provides a paper print out used for fax or mailing. Selecting the Do link to send the order or select Cancel to return to the order form screen. If Email is selected, an Email body text box will be displayed providing the user the option of sending a short message with the order. Selection of OK to continues the sending function. An Email notification message box will appear, where OK is selected.

Figure 6:
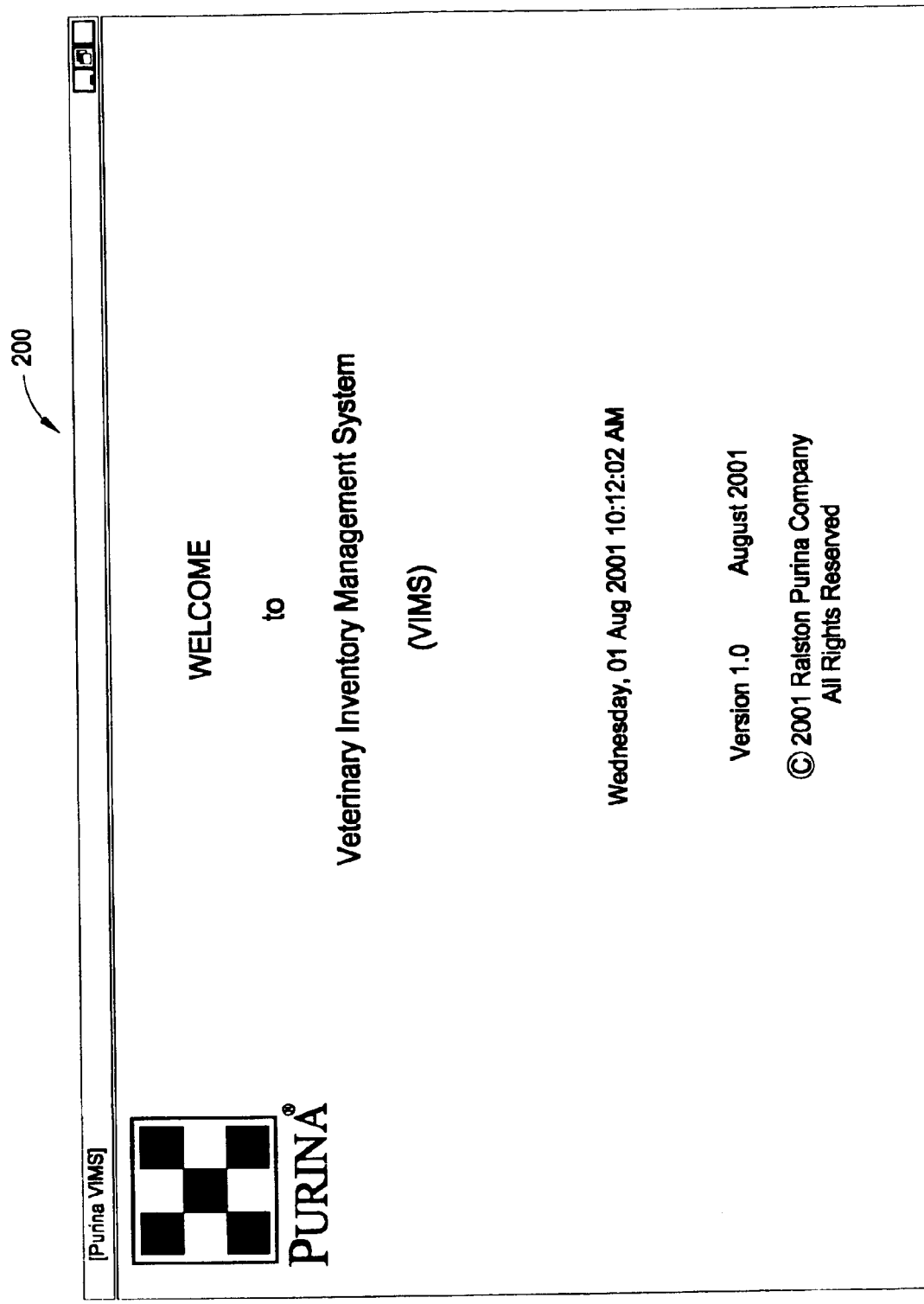
FIG. 6 is one embodiment of a welcome/home screen for the veterinary inventory management system (VIMS).

Inventory updates are also enabled with system 10. FIG. 6 is a flowchart 90 describing a procedure for updating an inventory. For manual entry, select the enter VIMS link from VIMS start-up procedures screen (shown in FIG. 7). The main menu screen is displayed and the user selects 92 the examine inventory link, causing an examine inventory screen (shown in FIG. 12) to be displayed. The user then selects the add new product link from the examine inventory screen. The user selects 94 the products they wish to add to inventory from the product UPC list. The user then optionally enters a SKU and a quantity on hand amount. The user then selects 96 the save new link. The user is able to continue to add products until inventory is complete. When the user has completed product entry, they select return to view 98 total inventory to view all products in inventory. Alternatively the user can select main menu to return to main menu screen. Using scanner 12 (shown in FIG. 1) allows inventory to be placed directly into the product UPC list, including SKU and quantity on hand.

Products may be added to the inventory stored on system 10 that have been scanned with scanner 12. When scanner uploads a self contained inventory list to computer 12, the VIMS software application will recognize products that are not currently a part of the catalog, and display a message to the user that there are a number of uncataloged products, and ask the user if they wish to view those uncataloged products. Entering a negative response causes system 10 to return to VIMS start-up procedures screen (shown in FIG. 7). A positive response causes system 10 to display add items to catalog screen (shown in FIG. 9). From add items to catalog screen, the user selects the check to add check box. The user then enters a product, a category, an item type, a manufacturer, and a weight. Some of these items are selectable from a displayed list. A primary distributor is also entered from a list, and a unit cost is entered. Selection of the done link returns system 10 to VIMS start-up procedures screen, saving entries without adding the entries to the catalog. Selecting the add product to catalog button will produce an uncataloged products message box. A negative response will exit without saving to the catalog. A positive response adds the products to the catalog. In addition, all or part of the list can be added to the catalog. The unfinished products will remain until updates are completed. A positive response will also causes system 10 to display a create UPC label message box will appear, where the user can create bar code labels for the added products. A similar procedure is used for adding products that have not been scanned, using above the described screens. The above described methods and systems are further implemented implemented through the user screens described below.

FIG. 6 is one embodiment of a Welcome/Home screen 200 for VIMS system 10. Screen 200 includes a welcome message and the current date and time settings as regulated by a clock function within personal computer 12.

Figure 7:
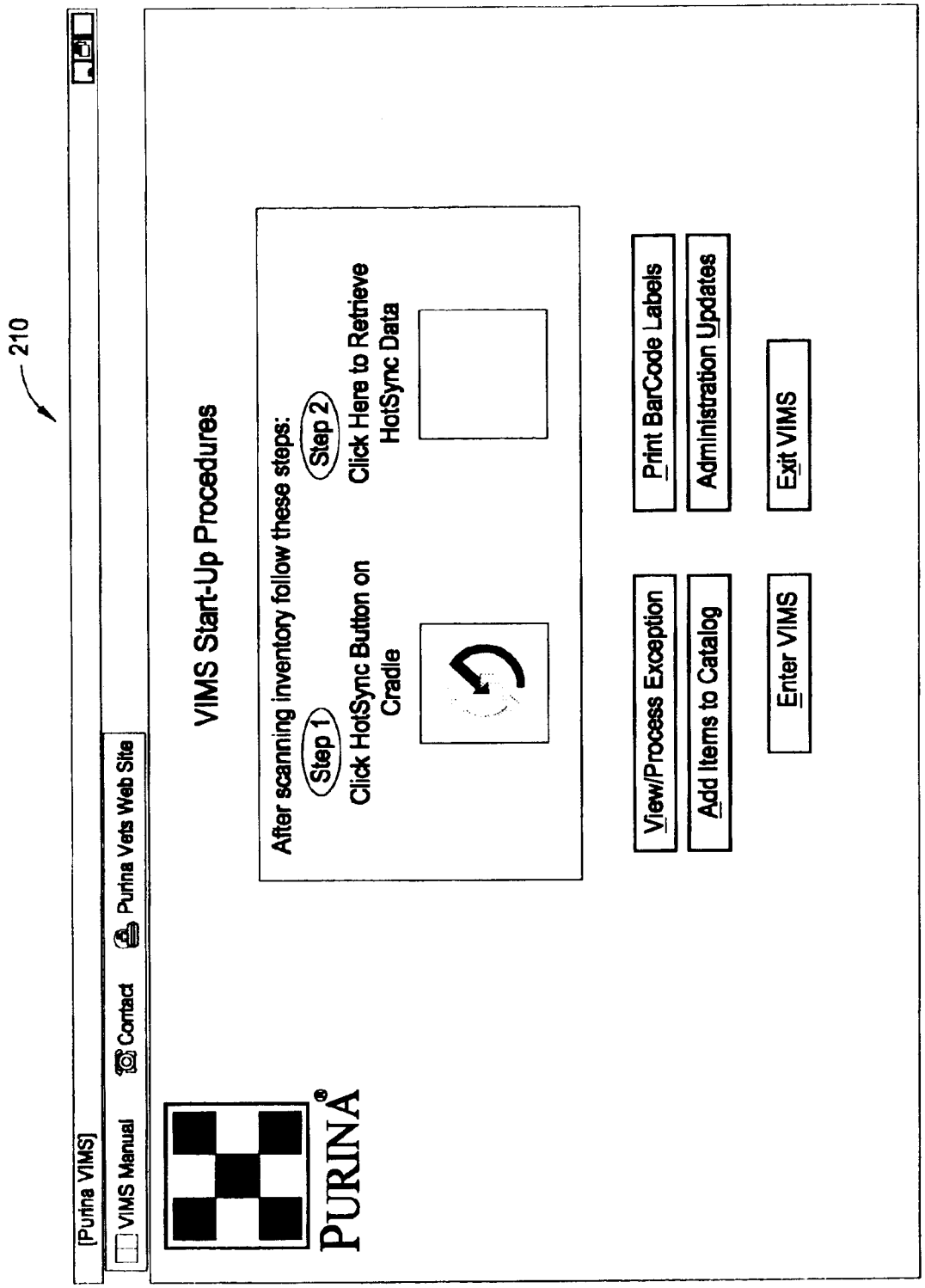
FIG. 7 is one embodiment of a VIMS start-up procedures screen.

FIG. 7 is one embodiment of a VIMS start-up procedures screen 210. Screen 210 is configured to enable a user to download scanned product information from scanner 14 to storage unit 24 within computer 12. In one embodiment, downloading is a two step process which includes selecting a hot sync button on a cradle (not shown) for the scanner and selecting a download link 202 to start the transfer of product information from scanner 14 to computer 12. When link 202 is selected, a text file is transferred from scanner 14 to computer 12, which is configured to analyze data within the text file and tag the information for each scanned product as an exception item (not currently in catalog) or as an existing product. When no exception items have been scanned, system 10 is configured to generate a replenishment order for the products which are below minimum quantities specified in the inventory setup.

Other links which are displayed on screen 210 allow users to enter VIMS and exit VIMS. In addition, other links are displayed including view/process exception, add items to catalog, print barcode labels, and administration updates. The view/process exception link causes an exception report to be displayed. The add items to catalog link causes an add items to catalog screen (shown below) to be displayed which allows users to add new products to a catalog. The print barcode labels link causes a label printing software package to be opened with the type of label to be printed. Within the label printing application, a file is opened for printing. In one embodiment, the file is either a master catalog file or a new barcode file. Selection of a file causes a barcode template to be displayed, and the user is presented with an action bar which includes a file print selection. Upon selection of file print, a print screen is displayed, and the user is able to select which of the records (barcodes) are to be printed. When complete the user selects to close the file from the action bar and the label printing application is exited.

The administration updates link, when logged onto system 10 as an administrator, allows the administrator to view and edit system requirements using a administration updates screen (shown in FIG. 10). When a user, who is not a system administrator selects the administration update link, an error message is displayed. The administration update screen allows users the ability to set directory paths for software packages and text files. Further, the administrator is able to update the product catalog. In one embodiment the product catalog is a file stored on a CD-ROM, floppy disk, computer hard drive, or other known storage means.

Figure 8:
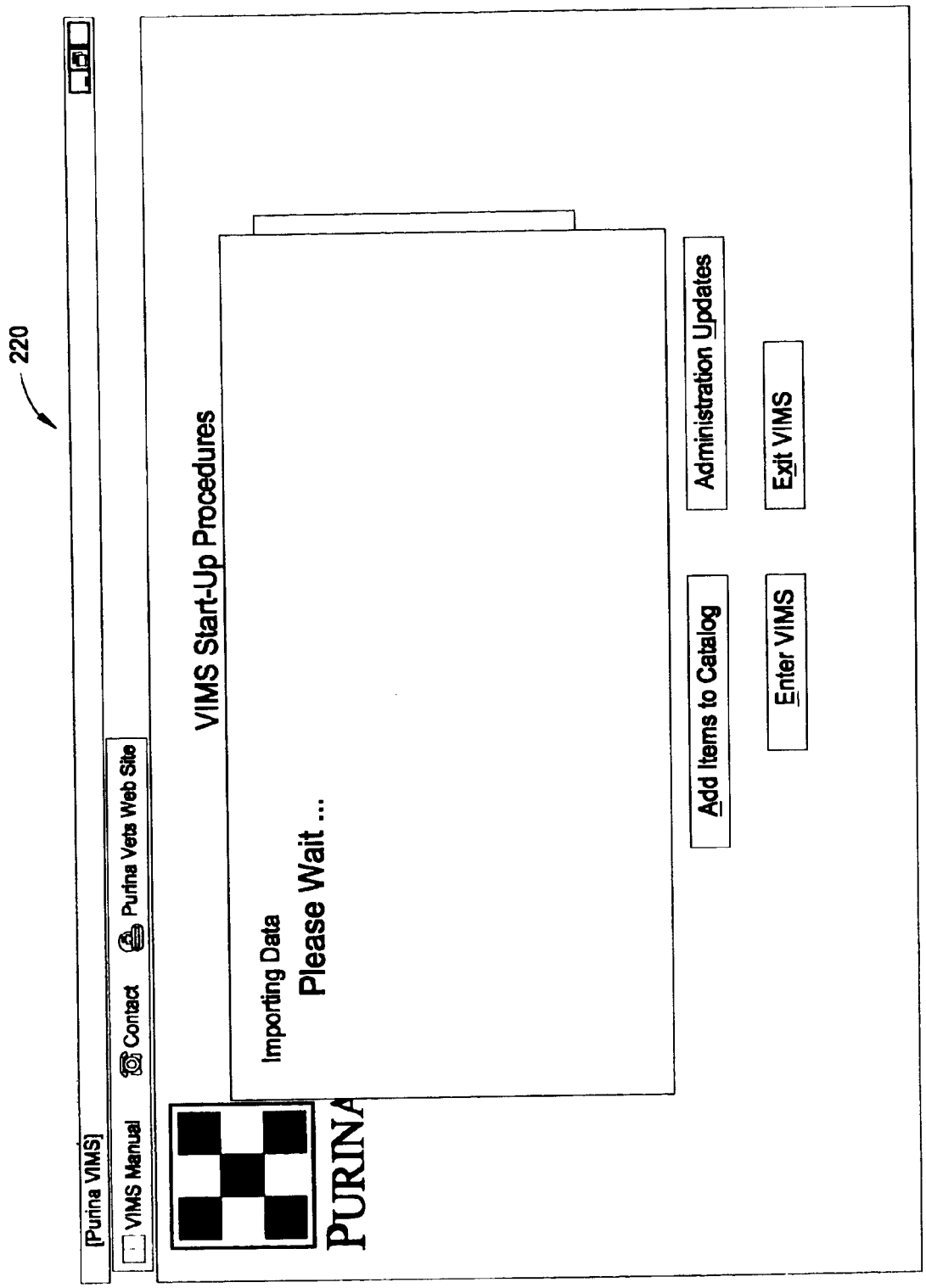
FIG. 8 is one embodiment of a message box screen.

FIG. 8 is an embodiment of a message box screen 220. Screen 220 is displayed when various system updates are being performed. Screen 220 includes a "please wait" message which includes an hourglass meant to signal the user that data from scanner 14 is being retrieved. During the display of screen 220, previous inventory is moved to history and date-stamped with the system date while a current inventory is being compiled. In addition, scanned items that are not in the product catalog are being tagged and will be displayed on an add items to catalog screen (shown in FIG. 9).

FIG. 9 is one example of an add items to catalog screen 230. Screen 230 provides a user with an ability to add and view exception products and in one embodiment, lists fields such as check to add, UPC, product, category, item type, manufacturer, weight, primary distributor ID (which is a required field), distributor unit cost, and any notes. Some of the fields are configured as pull down menus. A link labeled "Add Product to Catalog", if selected, prompts the user by inquiring whether they are sure that the products checked are to be added to the catalog. If the user is sure, a positive response (not shown) is selected and the checked products are added, including text files for the printing of bar codes for the added products. A selection of a done link causes computer 12 to display start up procedure screen 210 (shown in FIG. 7).

FIG. 10 is one embodiment of an administration update screen 240. Screen 240 allows the administrator the ability to set directory paths for label printing software, a catalog text file, an inventory text file, a label text file, a new product item text file to be added to the catalog text file, and a product order text file for emailing an order attachment. An update catalog link allows an administrator to update the product catalog using computer files provided by a vendor of the product. System 10 prompts the administrator for the file location. A selection of a start up procedures link causes computer 12 to display start up procedure screen 210 (shown in FIG. 7).

Figure 11:
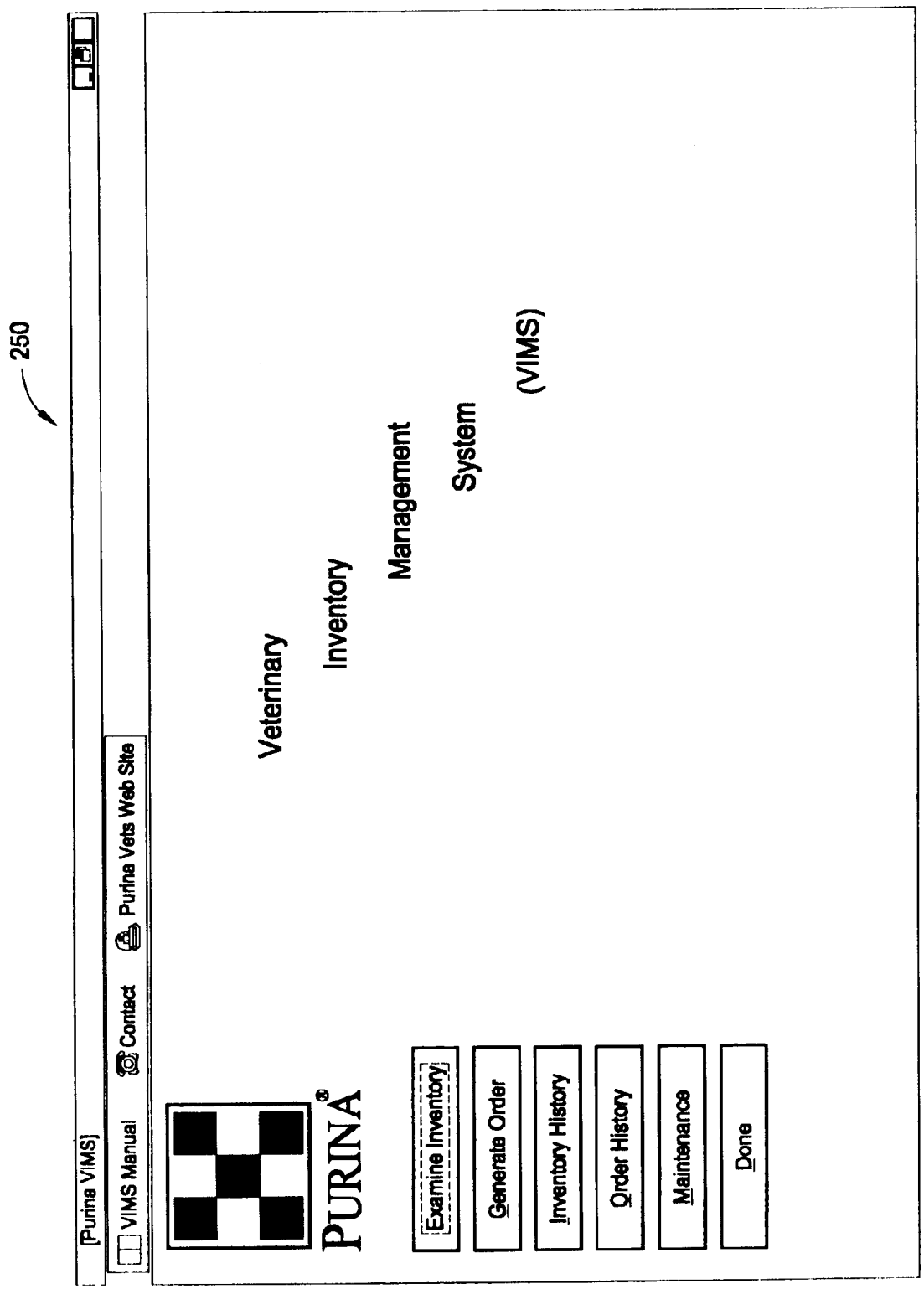
FIG. 11 is one embodiment of a main menu screen.

FIG. 11 is one embodiment of a main menu screen 250. Screen 250 is configured with a number of links, including an examine inventory link which causes computer 12 to display an examine inventory screen (shown in FIG. 12) and a generate order link which causes computer 12 to display an order form screen (shown in FIG. 13). An inventory history link opens an inventory history screen (shown in FIG. 14), while an order history link opens an order history screen (shown in FIG. 15). A maintenance link opens a maintenance screen (shown in FIG. 20). A done link causes welcome screen 200 (shown in FIG. 6) to be displayed with an option of exiting the application also available.

FIG. 12 is one embodiment of an examine inventory screen 260. Examine inventory screen 260 is configured to allow a user to show a list of total current inventory items, the list including inventory date, product UPC, product, size, SKU, quantity on hand, minimum allowed and maximum allowed fields. In addition, screen 260 provides a user with an ability to save changes on SKUs, an ability to save changes to quantity on hand, and allow previously scanned product quantities to be changed. A user is also able to update inventory items and quantities without the scanner, and by changing product quantity to zero (0), the product will no longer show as an inventory item. Links are included on screen 260 including an add new product link which causes an add item to current inventory screen 270 (shown in FIG. 13) to be opened which allows a user to add new products to an inventory An edit SKU link causes the user to be prompted with a message box for editing SKU numbers. Selection of an edit quantity link causes system 10 to prompt the user with a message box for editing quantity of a product. An edit minimums and maximums link causes system 10 to prompt the user with a message box for editing product minimum and maximum quantities. A remove minimums and maximums link causes system 10 to prompts the user with a message box for removing product from the catalog.

Screen 260 also includes links which enable a user to view and print a current inventory report which contains manufacturer, product, UPC, SKU, size, quantity on hand, minimum quantity, maximum quantity, and inventory date for the products on hand. Selection of a main menu link causes system 10 to display main menu screen 250 (shown in FIG. 11).

FIG. 13 is one embodiment of an add item to current inventory screen 270. Add item to current inventory screen 270 includes or alternatively allows a user to enter, for new products, at least one of product UPC, product name, product size, product SKU, and quantity on hand for the product. Screen 270 is used to enter new products that have not been scanned into inventory, and additionally allows a SKU field to be established, enabling vet or clinic the ability to add SKUs for the new products. A save new link causes system 10 to save newly selected catalog products. If the product has not been selected a message is displayed which states "Product Choice Must Exist". System 10 further validates that a quantity has been entered. A cancel link causes system 10 to cancel newly added entries.

Screen 270 also includes links which enable a user to return to examine inventory screen 260. Selection of a main menu link causes system 10 to display main menu screen 250 (shown in FIG. 11).

Figure 14:
FIG. 14 is one embodiment of an order form screen.

FIG. 14 is one embodiment of an order form screen 280. Order form screen 280 provides a user with an ability to open a purchase order drop down box allowing selection of previously entered purchase orders that have not been sent. In addition a user can select a distributor ID drop down box allowing the user to change the distributor for the order being sent. However, and in one embodiment, a distributor's name field is informational and cannot be changed. A charge number drop down box is provided which allows the user to change the charge number that the order has been assigned. A charge description field is for informational purposes. A ship to arrive by date field, if left empty, will cause system 10 to prompt the user with a message box containing "A Ship By date has not been entered. Do you wish to enter one now?".

Further included on screen 280 are a comment field, an order total which is derived from total cost, and a dual list box which shows available catalog items as an entire listing of catalog items and items to be ordered which indicates items that have been chosen to be ordered from the available catalog items portion of the list box. As items are selected, the item is removed from one list and added to the other.

Screen 280 also includes links which enable a user to perform a variety of functions. A supplemental order link causes system 10 to display a new order screen 290 (shown in FIG. 15). A replenishment order link causes system 10 to automatically generate orders based on inventory controls and inventory on hand and a primary distributor designated for each product. Selection of the replenishment order link causes a "Ship to Arrive by Date" to be automatically calculated, in one embodiment, the date is calculated as three days from the current date.

A save order link causes system 10 to save the order and prompt the user with a "save complete" message. A preview order link allows a user to view a product order report. When the user closes the report, a prompt which includes a message stating "Is purchase order XXXX complete and ready to be sent?" is displayed. A delete order link causes system 10 to delete an order following a positive user response to the prompt, "You are about to DELETE everything from Purchase Order 'XXX 123.' Do you wish to continue with deletion?" A send order link causes system 10 to open and display an order options screen (shown in FIG. 17).

An open orders link causes a dropdown list of orders not sent to be displayed. An edit quantity link allows quantity editing of an item in the items to be ordered list (items must be selected first) and prompts the user to enter a quantity for product desired. A cost per unit is displayed. A change distributor link allows a user to select individual products from the items to be ordered list and either add them to an existing order or create a new order for the distributor from whom the user wishes to order the product. Selection of a main menu link causes system 10 to display main menu screen 250 (shown in FIG. 11).

Figure 15:
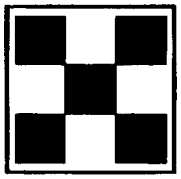
FIG. 15 is one embodiment of a new order screen.

FIG. 15 is one embodiment of a new order screen 290. New order screen 290 is accessible via a user selection of the supplemental order link on order form 280 (shown in FIG. 14). Screen 290 provides a user with an ability to add new purchase order numbers, validates that the purchase order number is not a duplicate of an existing open purchase order, and validates that a purchase order number and a distributor name has been entered. A distributor is selected from dropdown list as is a charge number. A user is further able to enter a ship to arrive by date for tracking purposes and comments relating to the order in a comment field.

Screen 290 includes an accept link which causes system 10 to accept an entered order and return to order form screen 280 (shown in FIG. 14) displaying both the supplemental and new order information. A cancel link cancels the order.

Figure 16:
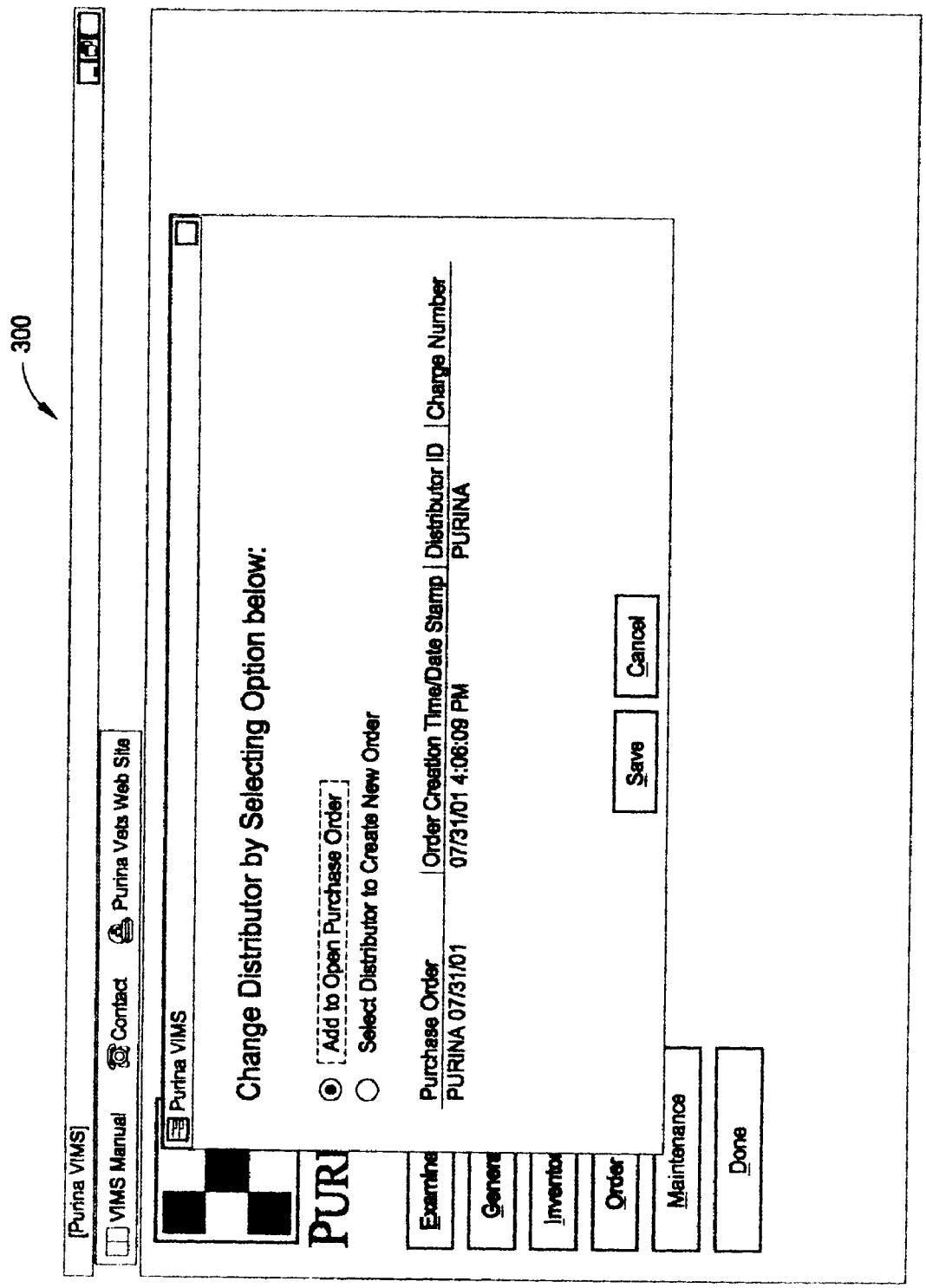
FIG. 16 is one embodiment of a change distributor screen.

FIG. 16 is one embodiment of a change distributor screen 300. Change distributor screen 300 provides a user with an ability to add to open purchase orders and an ability to select a distributor for creation of a new order. A save link causes system 10 to either save the selected ordered products to an existing open order or creates a new order and returns to order form screen 280 (shown in FIG. 14). A cancel link cancels distributor selection.

Figure 17:
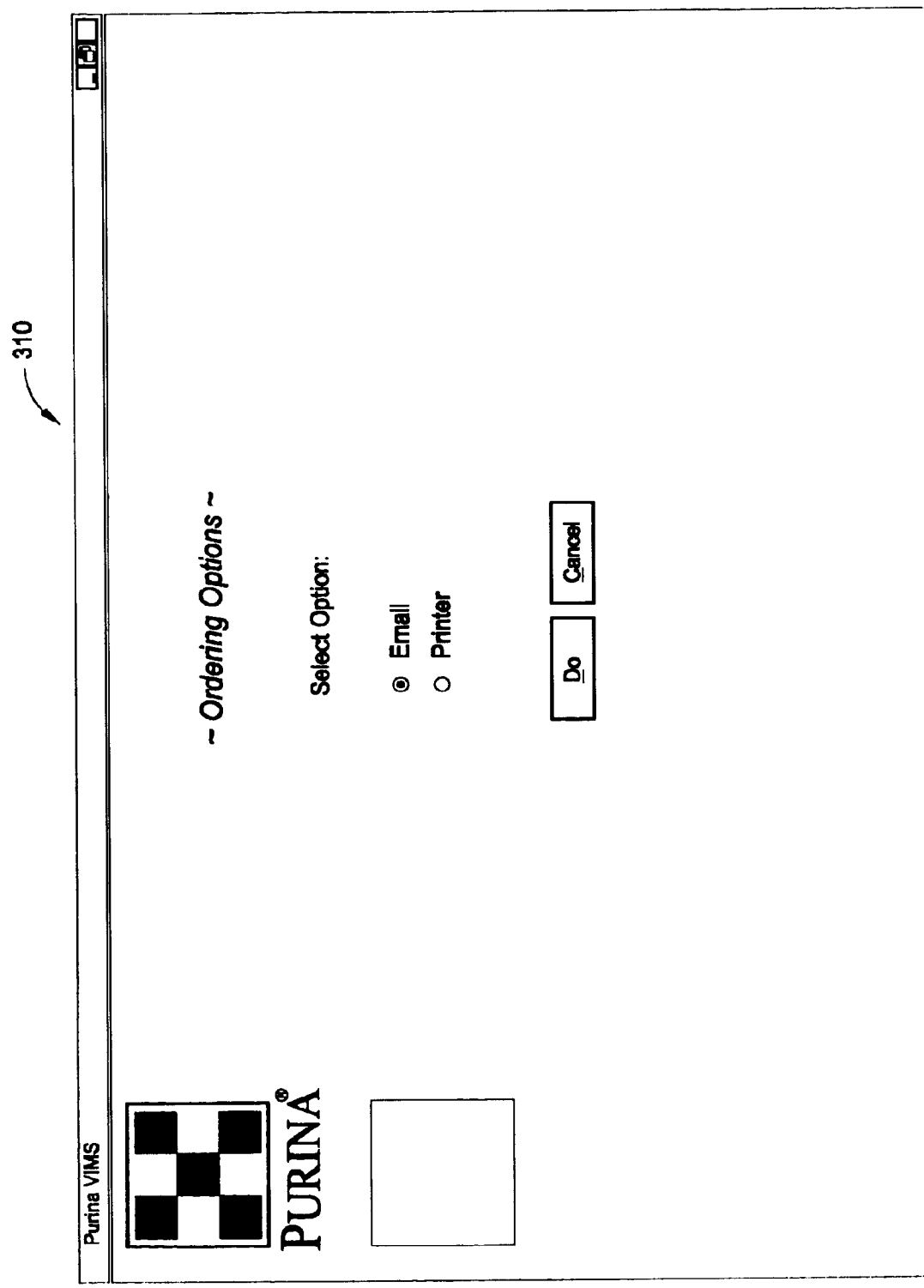
FIG. 17 is one embodiment of an ordering options screen.

FIG. 17 is one embodiment of an ordering options screen 310. Ordering options screen 310 is displayed the send order link on order form screen 280 is selected or when the review order link on order form screen 280 is selected. An E-mail selection on screen 310 will, upon confirmation, cause system 10 to E-mail an order to a distributor and designate the order as a historical entity. An email address used for sending the order is from a distributor data screen (shown in FIG. 25). If an email address does not exist, for the distributor, system will generate an error message for display and the order is not sent.

A print selection on screen 310 will, upon confirmation, cause system 10 to print a paper copy of the product order report. A do link serves as user confirmation of the option selected (email, printer (paper copy)) and disables a cancel link, which, when not disabled, allows a user to cancel ordering options and causes system 10 to display order form screen 280 (shown in FIG. 14). A done link (not shown) replaces the cancel order link after the report is sent, and causes system 10 to display order form screen 280.

FIG. 18 is one embodiment of an inventory history screen 320. Inventory history screen 320 provides a user with an archived inventory by date dropdown list and an ability to view archived inventories, which include inventory date, UPC, product, size, SKU, quantity on hand, minimum allowed and maximum allowed. Selection of a main menu link causes system 10 to display main menu screen 250 (shown in FIG. 11).

Figure 19:
FIG. 19 is one embodiment of an order history screen.

FIG. 19 is one embodiment of an order history screen 330. Order history screen 330 provides a user with an ability to view order histories including closed purchase orders number, distributor's name, charge number, charge description, ship to arrive by (date), order sent date, comment, and order total cost fields. Also provided is an ability to view complete list of items that were ordered containing UPC, product, size, quantity, unit cost, and total line cost fields.

A view/print history link causes system 10 to display a product order—history report (shown in FIG. 32). Selection of a main menu link causes system 10 to display main menu screen 250 (shown in FIG. 11).

Figure 20:
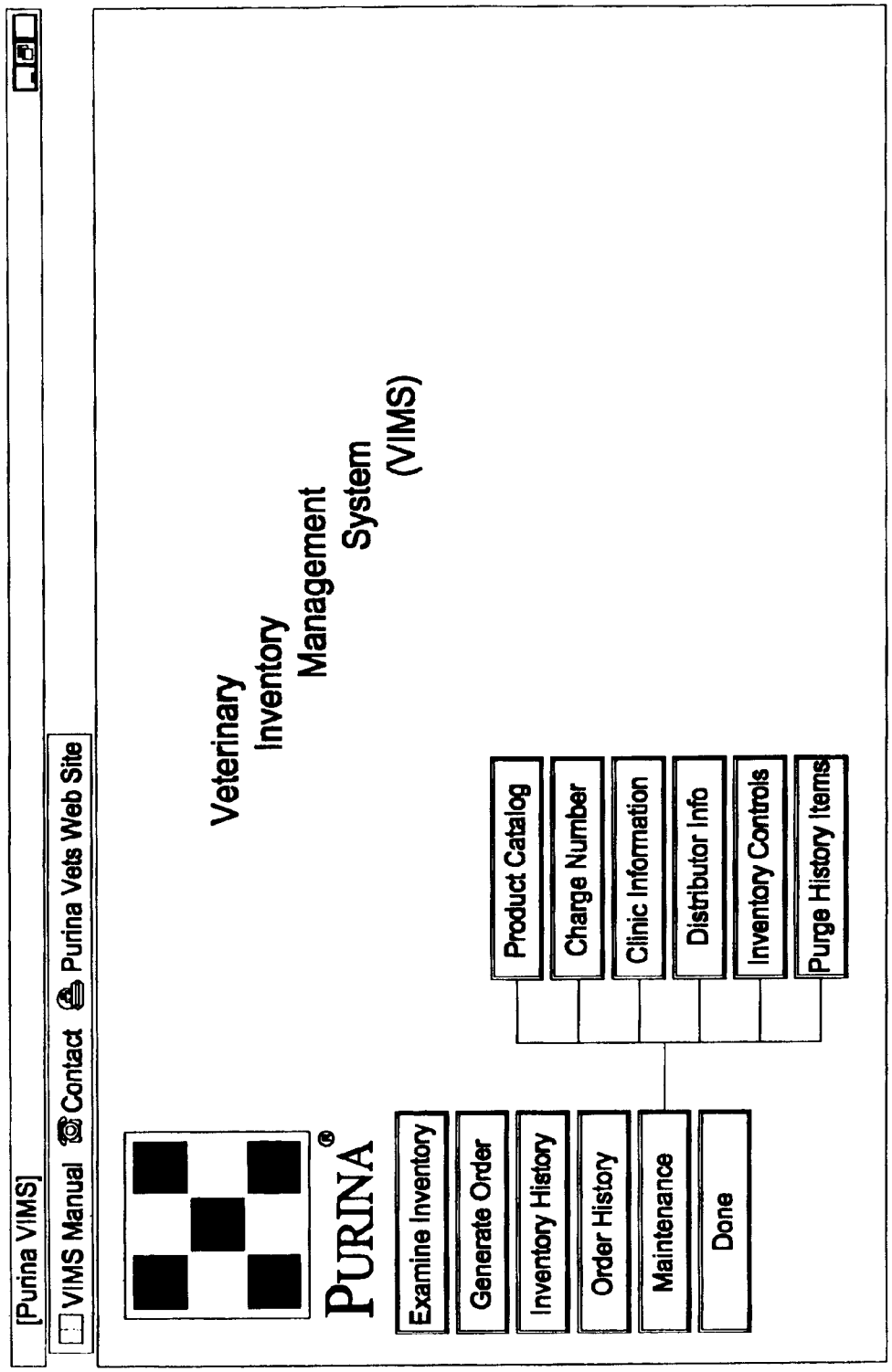
FIG. 20 is one embodiment of a maintenance menu screen.

FIG. 20 is one embodiment of a maintenance menu screen 340. Maintenance menu screen 340 provides a user with links to a product catalog screen (shown in FIG. 22), a charge number screen (shown in FIG. 23), a clinic information screen (shown in FIG. 24), a distributor information screen (shown in FIG. 25), an inventory controls screen (shown in FIG. 26), and a purge history items screen (shown in FIG. 28).

FIG. 21 is one embodiment of a view product catalog screen 350. View product catalog screen 350 provides a user with an ability to view the product catalog including UPC, product, manufacturer, primary distributor, unit cost, cost date, and size. An edit record causes system 10 to open product catalog screen 360 (shown in FIG. 22) with a selected record highlighted. An add new link opens product catalog screen 360. A view/print product report link causes system 10 to display a product order—history report (shown in FIG. 32). Selection of a maintenance menu link causes system 10 to display main menu screen 340 (shown in FIG. 20).

Figure 22:
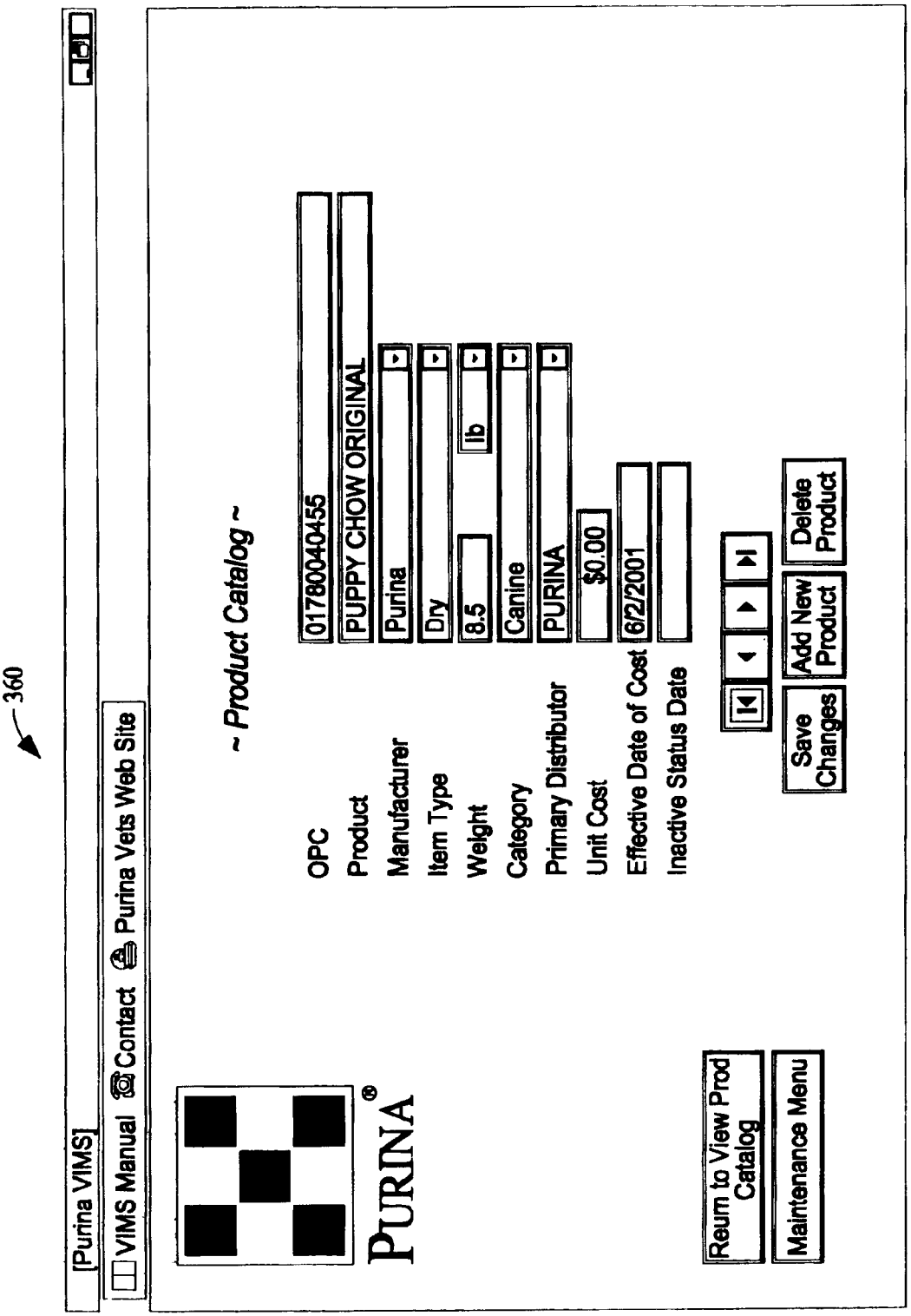
FIG. 22 is one embodiment of a product catalog screen.

FIG. 22 is one embodiment of a product catalog screen 360. Product catalog screen 360 provides a user with an ability to add new products including UPC, product, manufacturer, item type, weight, category, primary distributor, unit cost, effective date of cost, and inactive status date. Navigation buttons on screen 360 allow a user to go to a first record within the catalog, a previous record within the catalog, a next record within the catalog, a last record within the catalog.

A save changes link causes system 10 to save changes to products. An add new product link allows addition of new product to the catalog. A delete product link causes system 10 to delete products from the catalog. A save new link causes system 10 to save newly entered products. A cancel link causes system 10 to cancel a new product addition. A return to view product catalog link causes system 10 returns to view product catalog screen 350 (shown in FIG. 21). Selection of a maintenance menu link causes system 10 to display main menu screen 340 (shown in FIG. 20).

Figure 23:
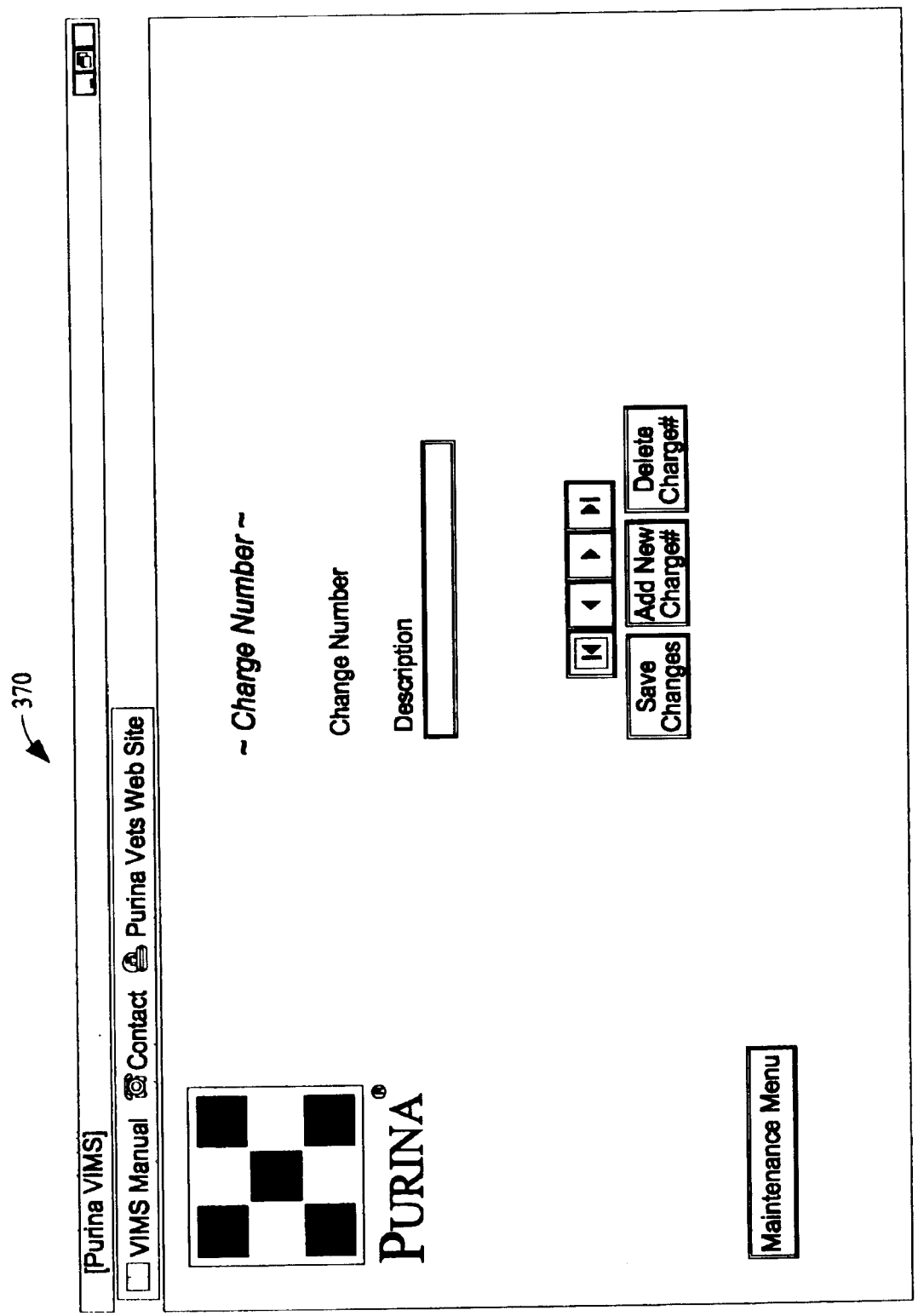
FIG. 23 is one embodiment of a charge number screen.

FIG. 23 is one embodiment of a charge number screen 370. Charge number screen 370 provides a user with an ability to add charge numbers and charge descriptions for the ordering of products. Navigation buttons on screen 370 allow a user to go to a first charge number record, a previous charge number record, a next charge number record, a last charge number record.

A save changes link causes system 10 to save changes to a charge description. An add new product charge number link allows addition of new charge numbers for a product. A delete product charge number link allows deletion of charge numbers. If a charge number has not been entered, a message is displayed stating a "charge number must exist" before allowing further action by the user. An add new charge number link allows addition of new charge numbers and a cancel link causes cancellation of new charge number additions. Selection of a maintenance menu link causes system 10 to display maintenance menu screen 340 (shown in FIG. 20).

Figure 24A:
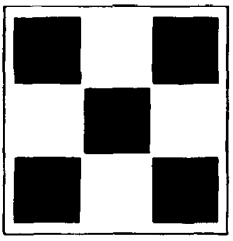

FIGS. 24A and 24B are one embodiment of a clinic information screen 380. Clinic information screen 380 provides a user with an ability to view and update the clinic address fields, including, clinic name, contact last name, contact first name, address 1, address 2, city, state, zip code, telephone number, extension, email address, and facsimile number. A user is further able to view and update shipping address fields including, contact last name, contact first name, address 1, address 2, city, state, zip code, telephone number, extension, email address, and facsimile number. In addition a user is able to view and update billing address fields including, contact last name, contact first name, address 1, address 2, city, state, zip code, telephone number, extension, email address, and facsimile number. Since much of the information in the clinic address, shipping address, and billing address may be duplicated for certain users, system 10 provides an ability for a user to copy clinic information into the shipping address fields and billing address fields. A clinic ID number is displayed on screen 380.

A save changes link saves changes to the fields and prompts the user with a save complete message. Selection of a maintenance menu link causes system 10 to display maintenance menu screen 340 (shown in FIG. 20).

Figure 25:
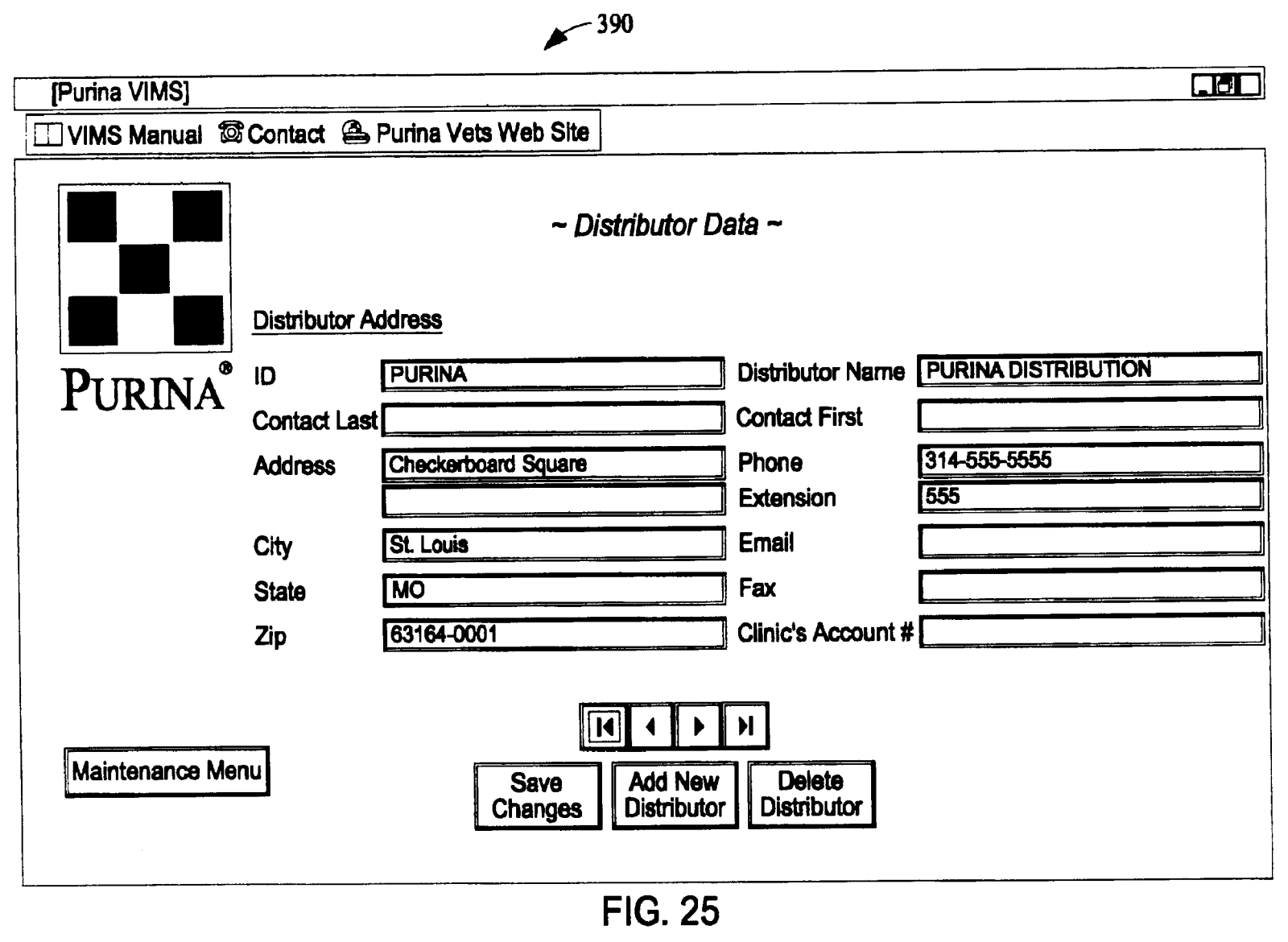

FIG. 25 is one embodiment of a distributor data screen 390. Distributor data screen 390 allows a user to view and update distributor address fields including, ID, distributor name, contact last name, contact first name, address 1, address 2, city, state, zip code, telephone number, extension, email address, facsimile number, and clinic account number. In one particular embodiment, if the fields for ID, distributor name, address 1, city, state, zip code, and telephone number are not completed, an error message is displayed.

Navigation buttons on screen 390 allow a user to go to a first distributor record, a previous distributor record, a next distributor record, a last distributor record. A save changes links allows a user to save changes that have been made in an existing distributor record. An add new distributor link causes system 10 to clear all fields and activate a save new maintenance button and a cancel maintenance button. Selection of a delete distributor link causes system 10 to promot a user with an "Are you sure you want to DELETE Distributor ID XXXXX–XXXXXXXXXXXX?" message box.

The save new link causes system 10 to create a new distributor record. A cancel link cancels the entry into a new distributor record. Selection of a maintenance menu link causes system 10 to display maintenance menu screen 340 (shown in FIG. 20).

FIG. 26 is one embodiment of a view inventory controls screen 400, which displays a listing of total inventory controls including UPC, product, size, SKU, minimum allowed, and maximum allowed fields. A set product controls link opens inventory controls screen 410 (shown in FIG. 27) for setting controls. Selection of an edit SKU link prompts the user with a message box for editing SKU numbers. Selection of an edit minimum and maximum link prompts the user with message box for editing product minimum and maximum quantities.

Selection of a view/print inventory controls link causes system 10 to enable viewing and/or printing of an inventory controls report (shown in FIG. 35). Selection of a maintenance menu link causes system 10 to display maintenance menu screen 340 (shown in FIG. 20).

Figure 27:
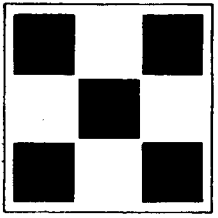
FIG. 27 is one embodiment of an inventory controls screen.

FIG. 27 is one embodiment of an inventory controls screen 410. Inventory controls screen 410 provides a user with an ability to view and edit order controls including UPC, SKU, minimum allowed, and maximum allowed fields. Selection of a save inventory item link causes system 10 to save the selected product. In one particular embodiment, a value greater than zero is entered into the minimum and maximum field to add the selected product and the maximum amount value is greater than the minimum amount. A cancel link is provided which causes system 10 to cancel changes and resets screen 410 to a first record in inventory.

A return to view inventory controls link selection causes system 10 to return to view inventory controls screen 400 (shown in FIG. 26) Selection of a maintenance menu link causes system 10 to display maintenance menu screen 340 (shown in FIG. 20).

Figure 28:
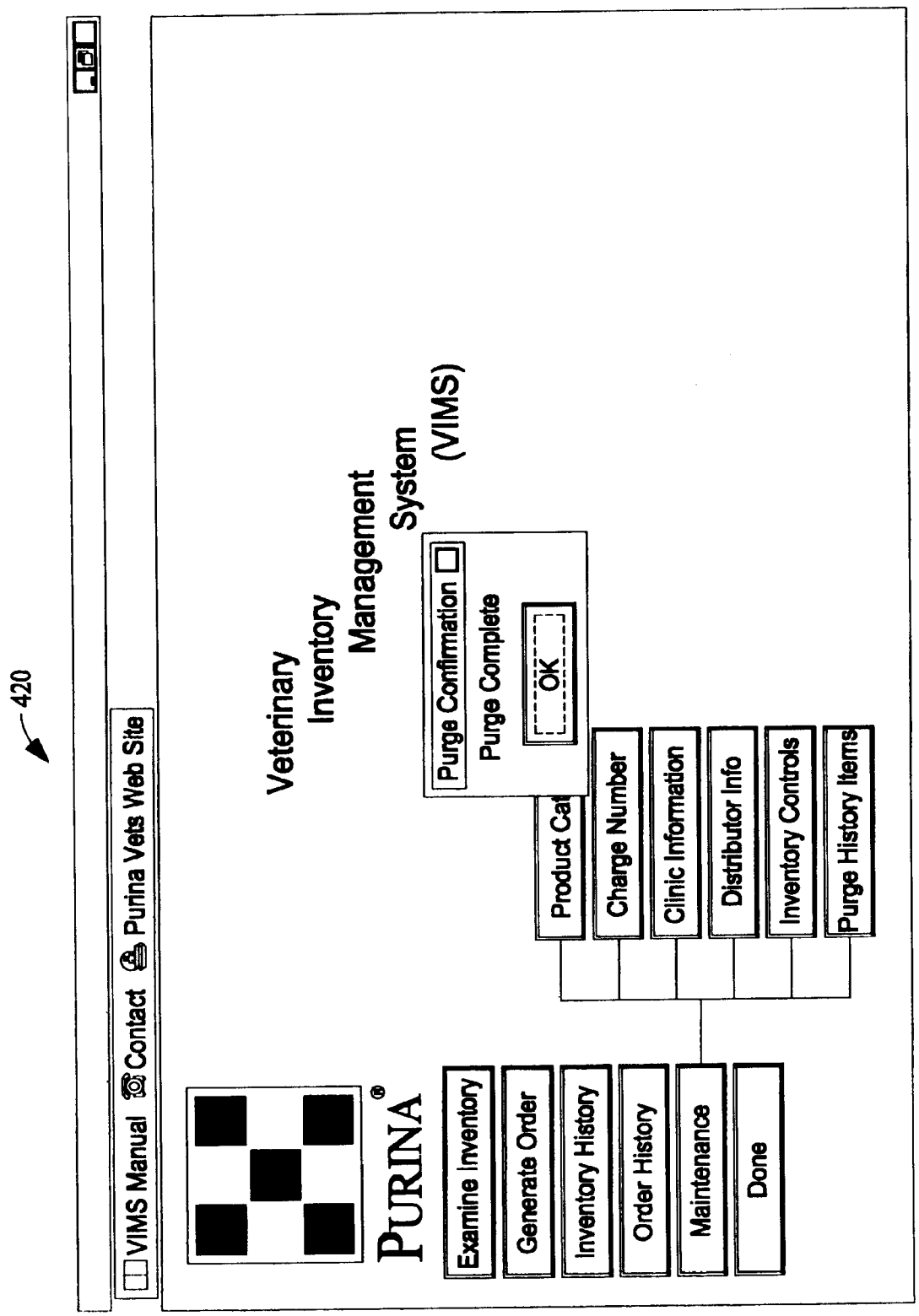
FIG. 28 is one embodiment of a purge history items screen.

FIG. 28 is one embodiment of a purge history items screen 420. Selection of a purge history items link within the maintenance menu causes system 10 to remove order history records, inventory history records, discontinued products and their cost records if those record are 18 months old or older. In addition, product costs whose cost-effective dates are greater than 18 months old. However, since each product should have a cost-effective date, system 10 will keep a record that is older than 18 months, if that record is the most current. Upon completion, system 10 causes purge complete message box to be displayed.

FIG. 29 is one embodiment of an exception report 430. An exception report is generated and displayed through selection of the view/process exception link on VIMS start-up procedures screen 210. The exception report is a report including UPC, product/note, and quantity of exception products (e.g. products that were scanned but not included in the catalog). The exception report is available for printing.

FIG. 30 is one embodiment of a current inventory report 440. A current inventory report is generated and displayed through selection of the view/print current inventory report link on examine inventory screen 260 (shown in FIG. 12). The current inventory report is a report including clinic name, manufacturer, product, UPC, SKU, size, quantity on hand, minimum quantity and maximum quantity, and inventory date. The current inventory report is available for printing.

FIG. 31 is one embodiment of a product order report 450. A product order report is generated and displayed through selection of the view/print order link on order form screen 280 (shown in FIG. 14). The product order report includes a ship to arrive by date, an order creation date, a purchase order number, a charge number, an account number, a distributor field to include: contact, voice number, voice number ext., and facsimile number, shipping information to include: clinic name, contact name, address line 1, address line 2, city, state, zip, and ship-to telephone number, and billing information to include: clinic name, contact name, address 1, address 2, city, state, zip, and ship-to telephone. Order details within product order report 450 include manufacturer, UPC, product, size, unit cost, quantity, total cost, and total order cost. When a user attempts to close report 450, a message box is displayed which includes a "Is purchase order XXX 123 completed and ready to be sent?" prompt with selection of 'Yes' or 'No'. The product order report is available for printing.

FIG. 32 is one embodiment of a product order—history report 460. Product order—history report 460 is generated through selection of the view/print history link on order history screen 330 (shown in FIG. 19) and includes a ship to arrive by date, an order creation date, an order sent field, a purchase order number, a charge number, an account number, a product order, a distributor field to include contact, voice number, voice number ext., and facsimile number, shipping information including clinic name, contact name, address line 1, address line 2, city, state, zip, and a ship-to telephone number, and billing information to include clinic name, contact name, address 1, address 2, city, state, zip, and ship-to telephone number. Order detail within report 460 includes manufacturer, UPC, product, size, unit cost, quantity, total cost, and total order cost. Product order—history report 460 is available for printing.

FIG. 33 is one embodiment of a product report 470. Product reports are generated and displayed through selection of the view/print product report link on view product catalog screen 350 (shown in FIG. 21). Product report 470 includes UPC, product, manufacturer, distributor, size, unit cost, and cost date and is available for printing.

FIG. 34 is one embodiment of a primary product distributor conflict report 480. Primary product distributor conflict reports are generated through selection of the delete link on distributor data screen 390 (shown in FIG. 25) when the distributor being deleted is a primary distributor for a product. In one embodiment, a distributor will not be deleted until the conflicts involving the distributor have been resolved. Primary product distributor conflict report 480 includes UPC and product fields for the items resulting in the conflict and is available for printing.

FIG. 35 is one embodiment of an inventory controls report 490. Inventory controls report 490 is generated through selection of the view/print inventory controls link on view inventory controls screen 400 (shown in FIG. 26). Report 490 includes a list of inventory controls containing UPC, product, size, SKU, minimum allowed, and maximum allowed fields. Report 490 is also available for printing.

As is evident from the description of system 10 (shown in FIG. 1), the methods (shown in FIGS. 2–6), and the description of the screens (shown in FIGS. 6–28) and reports (shown in FIGS. 29–35) system 10 configured with the computer program for generating the screens and reports, is a valuable tool for the inventory management of a veterinary, pet specialty, pet related goods within grocery stores and other related practices. In addition, other embodiments are contemplated which provide training, for example, through video streaming.

While the invention has been described in terms of various specific embodiments, those skilled in the art will recognize that the invention can be practiced with modification within the spirit and scope of the claims.

What is claimed is:

1. A veterinary inventory management system comprising:
    a computer;
    a scanning device capable of interfacing to said computer;
    at least one printer capable of interfacing to said computer; and
    a computer program which enables said computer to:
        store in a central database a list including predetermined product levels required for maintaining a veterinary practice inventory;
        identify the actual products maintained within the veterinary practice inventory by scanning the plurality of products currently within the veterinary practice inventory;
        identify veterinary product shortages by matching the actual products to the list of predetermined product levels;
        automatically assign each identified veterinary product shortage to a predetermined veterinary product distributor; and
        automatically prepare and transmit a product order to each predetermined veterinary product distributor based on each identified veterinary product shortage.

2. A system according to claim 1 wherein said computer program configures said computer to allow addition of non-standard items to an inventory file.

3. A system according to claim 2 wherein the non-standard items are specific to a user's specific veterinary practice.

4. A system according to claim 1 wherein said scanning device is a hand-held bar code scanner.

5. A system according to claim 4 wherein said scanner is configurable with pre-determined product levels.

6. A system according to claim 1 wherein said at least one printer comprises a bar code printer and a standard page printer.

7. A system according to claim 6 wherein for a bar code printer, said system is configured with a label printing software application.

8. A system according to claim 6 wherein for a standard page printer, said system is configured with a document printing software application.

9. A system according to claim 1 wherein said computer is configured to generate orders for electronic mailing, facsimile, courier, or postal service delivery.

10. A system according to claim 1 wherein said computer program configures said computer to display at least one of an examine inventory screen, an order form screen, an inventory history screen, an order history screen, and a maintenance screen.

11. A system according to claim 10 wherein said examine inventory screen provides a user with a list of total current inventory items, the list including at least one of inventory date, product UPC, product, size, SKU, quantity on hand, minimum allowed and maximum allowed fields.

12. A system according to claim 10 wherein said examine inventory screen provides a user with a user interface for at least one of changing SKUs, changing quantities on hand, changing previously scanned product quantities, updating inventory items and quantities, and editing product minimum and maximum quantities.

13. A system according to claim 10 wherein said order form screen provides a user with a user interface for at least one of placing a supplemental order, placing a replenishment order, saving an order, viewing product order reports, deleting orders, sending orders, opening an order.

14. A system according to claim 13 wherein said replenishment order user interface enables a user to cause said system to automatically generate orders based on at least one of inventory controls, inventory on hand and a primary distributor designated for each product.

15. A system according to claim 13 wherein said replenishment order user interface enables a user to cause said system to automatically calculate a ship to arrive by date for the order.

16. A system according to claim 10 wherein said inventory history screen provides a user with a user interface for viewing archived inventories, which include at least one of an inventory date, a UPC, a product, a size, a SKU, a quantity on hand, a minimum quantity allowed and a maximum quantity allowed.

17. A system according to claim 10 wherein said order history screen provides a user with a user interface for viewing order histories including at least one of a closed purchase orders number, a distributor's name, a charge number, a charge description, a ship to arrive by date, an order sent date, a comment, and an order total cost field.

18. A system according to claim 10 wherein said order history screen provides a user with a user interface for viewing a list of items ordered, including at least one of a UPC, a product, a size, a quantity, a unit cost, and a total line cost.

19. A system according to claim 10 wherein said maintenance screen provides a user with a user interface for selecting at least one of a product catalog screen, a charge number screen, a clinic information screen, a distributor data screen, an inventory controls screen, and a purge history items screen.

20. A system according to claim 19 wherein said product catalog screen provides a user with a user interface for adding new product records, including at least one of a UPC, a product, a manufacturer, an item type, a weight, a category, a primary distributor, a unit cost, an effective date of cost, and an inactive status date, saving changes to product records, deleting product records, and saving new product records.

21. A system according to claim 19 wherein said charge number screen provides a user with a user interface for at least one of adding, changing, saving and deleting charge numbers and charge descriptions for the ordering of products.

22. A system according to claim 19 wherein said clinic information screen provides a user with a user interface for adding and changing at least one of a clinic name, a clinic address, a shipping address, and a billing address, wherein said clinic address, said shipping address, and said billing address includes at least one of a contact last name, a contact first name, an address, a city, a state, a zip code, a telephone number, an extension, an email address, and a facsimile number.

23. A system according to claim 19 wherein said distributor data screen provides a user with a user interface for viewing, adding, deleting, and updating distributor records including at least one of a distributor ID, a distributor name, a contact last name, a contact first name, an address, a city, a state, a zip code, a telephone number, an extension, an email address, a facsimile number, and a clinic account number.

24. A system according to claim 19 wherein said inventory controls screen provides a user with a user interface for viewing and editing order controls including at least one of a UPC, a SKU, a minimum allowed, and a maximum allowed.

25. A system according to claim 19 wherein said purge history items screen provides a user with a user interface for removing order history records, inventory history records, discontinued products and their cost records, if the records are 18 months old or older.

26. A system according to claim 19 wherein said purge history items screen provides a user with a user interface for removing product costs whose cost-effective dates are greater than 18 months old, unless a product cost record that is older than 18 months is the most current product cost record.

27. A computer programmed to:
store in a central database a list including predetermined product levels required for maintaining a veterinary practice inventory;
identify the actual products maintained within the veterinary practice inventory by scanning the plurality of products currently within the veterinary practice inventory;
identify veterinary product shortages by matching the actual products to the list of predetermined product levels;
automatically assign each identified veterinary product shortage to a predetermined veterinary product distributor;
allow addition of non-standard items to a veterinary practice inventory; and
automatically prepare and transmit a product order to each predetermined veterinary product distributor based on each identified veterinary product shortage using at least one of electronic mailing, facsimile, courier, or postal service delivery.

28. A computer according to claim 27 further programmed to display an examine inventory screen which provides a user with a list of total current inventory items, the list including at least one of inventory date, product UPC, product, size, SKU, quantity on hand, minimum allowed and maximum allowed fields.

29. A computer according to claim 27 further programmed to display an order form screen which provides a user with a user interface for at least one of placing a supplemental order, placing a replenishment order, saving an order, viewing product order reports, deleting orders, sending orders, and opening an order.

30. A computer according to claim 27 further programmed to display an inventory history screen which provides a user with a user interface for viewing archived inventories, which include at least one of an inventory date, a UPC, a product, a size, a SKU, a quantity on hand, a minimum quantity allowed and a maximum quantity allowed.

31. A computer according to claim 27 further programmed to display an order history screen which provides a user with a user interface for viewing order histories including at least one of a closed purchase orders number, a distributor's name, a charge number, a charge description, a ship to arrive by date, an order sent date, a comment, an order total cost field, and a list of items ordered, including at least one of a UPC, a product, a size, a quantity, a unit cost, and a total line cost.

32. A computer according to claim 27 further programmed to display a screen which provides a user interface for at least one of adding new product records, updating charge numbers and charge descriptions, updating clinic information, updating distributor data, updating order controls, and purging records.

33. A computer according to claim 32 wherein to purge records, said computer provides a user with a user interface for removing product costs whose cost-effective dates are greater than 18 months old, unless a product cost record that is older than 18 months is the most current product cost record.

34. A computer according to claim 27 programmed to automatically generate orders based on at least one of inventory controls, inventory on hand and a primary distributor designated for each product.

35. A method for creating an inventory control using a veterinary inventory management system, comprising:
displaying a maintenance list;
selecting an inventory controls link from the maintenance list;
displaying an inventory controls screen;
selecting a set product controls link;
adding products from a product UPC list; and
saving the added product entries.

36. A method according to claim 35 further comprising entering at least one of a SKU, a minimum allowed per unit amount, and a minimum allowed per unit amount.

37. A method for placing replenishment orders using a veterinary inventory management system, comprising:
storing in a central database a list including predetermined product levels required for maintaining a veterinary practice inventory;
identifying the actual products maintained within the veterinary practice inventory by scanning the plurality of products currently within the veterinary practice inventory;
identifying veterinary product shortages by matching the actual products to the list of predetermined product levels;
automatically assigning each identified veterinary product shortage to a predetermined veterinary product distributor;
automatically creating a product order for each predetermined veterinary product distributor based on each identified veterinary product shortage;
displaying a number of orders that have been created;
selecting one of the orders; and
sending the order using at least one of electronic mailing, facsimile, courier, or postal service delivery.

38. A method according to claim 37 further comprising displaying an order form.

39. A method according to claim 37 wherein displaying a number of orders that have been created comprises listing created orders in an open purchase order list box.

40. A method for placing supplemental orders using a veterinary inventory management system, comprising:
storing in a central database a list including predetermined product levels required for maintaining a veterinary practice inventory;
identifying the actual products maintained within the veterinary practice inventory by scanning the plurality of products currently within the veterinary practice inventory;
identifying veterinary product shortages by matching the actual products to the list of predetermined product levels;

automatically assigning each identified veterinary product shortage to a predetermined veterinary product distributor;

automatically creating a product order for each predetermined veterinary product distributor based on each identified veterinary product shortage, wherein automatically creating a product order includes displaying an order form screen;

selecting a supplemental order form link from the order form screen;

displaying a new order screen;

entering at least one of a purchase order number, a distributor's name, a charge number, a ship to arrive by date, and comments for items within the supplemental order;

moving the items to an order; and sending the order.

41. A method of updating an inventory using a veterinary inventory management system, comprising:

storing in a central database a list including predetermined product levels required for maintaining a veterinary practice inventory;

identifying the actual products maintained within the veterinary practice inventory by scanning the plurality of products currently within the veterinary practice inventory;

identifying veterinary product shortages by matching the actual products to the list of predetermined product levels;

automatically assigning each identified veterinary product shortage to a predetermined veterinary product distributor;

displaying an examine inventory screen;

selecting to add new products from the screen;

saving the new product additions into the inventory;

viewing the inventory; and automatically creating a product order for each predetermined veterinary product distributor based on each identified veterinary product shortage.

42. A method according to claim 41 further comprising entering a SKU and a quantity on hand amount.

43. A method according to claim 41 wherein new products are added from a scanner memory.

44. A method according to claim 43 further comprising:

recognizing products uploaded from the scanner memory that are not a part of a current catalog;

prompting a user to view the non-cataloged products;

displaying an add items to catalog screen;

entering at least one of a product, a category, an item type, a weight, a primary distributor, and a unit cost for the non-cataloged products;

adding at least one of the products to the catalog; and creating a new label file for printing of barcode labels for the newly added products.

* * * * *